United States Patent
Zhang et al.

(10) Patent No.: US 12,154,011 B2
(45) Date of Patent: Nov. 26, 2024

(54) DEEP CONTINUOUS 3D HAND POSE TRACKING

(71) Applicants: Cornell University, Ithaca, NY (US); Wisconsin Alumni Research Foundation, Madison, WI (US)

(72) Inventors: Cheng Zhang, Ithaca, NY (US); Fang Hu, Henan (CN); Yin Li, Madison, WI (US)

(73) Assignees: Cornell University, Ithaca, NY (US); Wisconsin Alumni Research Foundation, Madison, WI (US)

(*) Notice: Subject to any disclaimer, the term of this patent is extended or adjusted under 35 U.S.C. 154(b) by 11 days.

(21) Appl. No.: 17/921,009

(22) PCT Filed: Apr. 26, 2021

(86) PCT No.: PCT/US2021/029189
§ 371 (c)(1),
(2) Date: Oct. 24, 2022

(87) PCT Pub. No.: WO2021/217142
PCT Pub. Date: Oct. 28, 2021

(65) Prior Publication Data
US 2023/0260155 A1   Aug. 17, 2023

Related U.S. Application Data
(60) Provisional application No. 63/015,381, filed on Apr. 24, 2020.

(51) Int. Cl.
*G06T 7/70* (2017.01)
*G06F 3/01* (2006.01)
(Continued)

(52) U.S. Cl.
CPC ............ *G06N 20/10* (2019.01); *G06F 3/017* (2013.01); *G06F 18/24* (2023.01); *G06T 7/70* (2017.01);
(Continued)

(58) Field of Classification Search
CPC ......... G06N 20/10; G06F 3/017; G06F 18/24; G06F 3/014; G06T 7/70; G06T 7/75;
(Continued)

(56) References Cited

U.S. PATENT DOCUMENTS

2002/0024500 A1* 2/2002 Howard .................. G06F 3/014
345/158
2004/0263473 A1 12/2004 Cho et al.
(Continued)

FOREIGN PATENT DOCUMENTS

WO     2021217142 A1   10/2021

OTHER PUBLICATIONS

T. Maekawa et al., "Object-based Activity Recognition with Heterogeneous Sensors on Wrist," Proceedings of International Conference on Pervasive Computing, May 2010, 18 pages.
(Continued)

*Primary Examiner* — Tung T Vo
(74) *Attorney, Agent, or Firm* — Ryan, Mason & Lewis, LLP

(57) ABSTRACT

A wrist-mounted system for tracking hand poses includes one or more cameras mounted to a wearable band. In some examples, the one or more cameras are low profile and may be located less than 15 mm, and preferably less than 10 mm, of the wrist of the user. In some examples, a system includes a wearable band and one or more imaging sensors. The one or more imaging sensors are disposed to have a field of view that is anatomically distal when the wearable band is coupled to an arm of the user. The one or more imaging
(Continued)

sensors each define an optical axis spaced from the wearable band of less than 15 mm, and preferably less than 10 mm. The image data may come from a single camera mounted on the back of the wrist which captures images of the surface contours of the back of the hand to infer hand poses and gestures.

23 Claims, 10 Drawing Sheets

(51) Int. Cl.
    G06F 18/24    (2023.01)
    G06N 20/10    (2019.01)
    G06T 7/00    (2017.01)
    G06T 7/73    (2017.01)
    G06V 40/20    (2022.01)
    H04N 5/262    (2006.01)
    H04N 23/90    (2023.01)

(52) U.S. Cl.
    CPC ............ *G06T 7/75* (2017.01); *G06T 7/97* (2017.01); *H04N 5/2624* (2013.01); *H04N 23/90* (2023.01); *G06F 3/014* (2013.01); *G06T 2207/20081* (2013.01); *G06T 2207/20221* (2013.01); *G06T 2207/30196* (2013.01); *G06V 40/28* (2022.01)

(58) Field of Classification Search
    CPC ......... G06T 7/97; G06T 2207/20081; G06T 2207/20221; G06T 2207/30196; H04N 5/2624; H04N 23/90; G06V 40/28
    USPC ................................................ 348/135
    See application file for complete search history.

(56) References Cited

U.S. PATENT DOCUMENTS

| | | | |
|---|---|---|---|
| 2014/0055352 A1* | 2/2014 | Davis | G06F 3/014 345/156 |
| 2014/0098018 A1* | 4/2014 | Kim | G06F 3/014 345/156 |
| 2015/0309582 A1* | 10/2015 | Gupta | G06F 3/011 345/156 |
| 2016/0306932 A1* | 10/2016 | Fateh | H04N 23/57 |
| 2017/0315620 A1* | 11/2017 | Johri | G06T 7/70 |
| 2018/0011545 A1 | 1/2018 | Stafford et al. | |
| 2018/0129284 A1* | 5/2018 | Davis | A61B 5/1125 |
| 2022/0051145 A1 | 2/2022 | Zhang | |

OTHER PUBLICATIONS

C. Qian et al., "Realtime and Robust Hand Tracking from Depth," Proceedings of the IEEE Conference on Computer Vision and Pattern Recognition, Jun. 2014, 8 pages.
G. Rogez et al., "3D Hand Pose Detection in Egocentric RGB-D Images," arXiv:1412.0065v1, Nov. 29, 2014, 14 pages.
A. Marturana Winderl, "An Easy and Effective Dumbbell Arm, Back, and Chest Workout," https://www.self.com/gallery/dumbbell-arm-exercises-triceps, Feb. 9, 2019, 16 pages.
Ultimate Body Press, "Activate and Leverage your Metabolism for Daily Fitness Results," https://ultimatebodypress.com/pages/activate-and-leverage-your-metabolism-for-daily-fitness-results, Accessed Oct. 20, 2022, 4 pages.
K.-H. Chang et al., "Tracking Free-Weight Exercises," International Conference on Ubiquitous Computing, Jul. 2007, pp. 19-37.
H. Ding et al., "FEMO: A Platform for Free-weight Exercise Monitoring with RFIDs," Proceedings of the 13th ACM Conference on Embedded Networked Sensor Systems, Nov. 2015, pp. 141-154.
A. Ebert et al., "SensX: About Sensing and Assessment of Complex Human Motion," arXiv:1703.02847v2, Nov. 22, 2017, 6 pages.
American Council On Exercise, "Phase 2: Movement Training," 2014, 5 pages.
S. Gauthier et al., "Human Movement Quantification using Kinect for In-Home Physical Exercise Monitoring," IEEE International Conference on Computational Intelligence and Virtual Environments for Measurement Systems and Applications, May 2014, 6 pages.
Men's Health, "15-minute Arm-strengthening Dumbbell Workout," https://www.menshealth.com.au/15-minute-arm-strengthening-dumbbell-workout/, May 1, 2021, 8 pages.
Julianna, "5 Easy Exercises for Toned Arms at Home," https://juliannafitness.blogspot.com/2016/05/5-easy-exercises-for-toned-arms-at-home.html, May 14, 2016, 6 pages.
R. Khurana et al., "GymCam: Detecting, Recognizing and Tracking Simultaneous Exercises in Unconstrained Scenes," Proceedings of the ACM on Interactive, Mobile, Wearable and Ubiquitous Technologies, vol. 2, No. 4, Dec. 2018, pp. 185:1-185:17.
T. Krosshaug et al., "Biomechanical Analysis of Anterior Cruciate Ligament Injury Mechanisms: Three-Dimensional Motion Reconstruction from Video Sequences," Scandinavian Journal of Medicine & Science in Sports, vol. 17, Nov. 2007, pp. 508-519.
A. Lees, "Technique Analysis in Sports: A Critical Review," Journal of Sports Sciences, vol. 20, Jan. 2002, pp. 813-828.
Y. Liu et al., "Real-time Arm Skeleton Tracking and Gesture Inference Tolerant to Missing Wearable Sensors," Proceedings of the 17th Annual International Conference on Mobile Systems, Applications, and Services, Jun. 2019, pp. 287-299.
D. Morris et al., "RecoFit: Using a Wearable Sensor to Find, Recognize, and Count Repetitive Exercises," Proceedings of the SIGCHI Conference on Human Factors in Computing Systems, Apr. 2014, pp. 3225-3234.
D. Pruthi et al., "Maxxyt: An Autonomous Wearable Device for Real-Time Tracking of a Wide Range of Exercises," UKSIM-AMSS International Conference on Modelling and Simulation, Mar. 2015, pp. 137-141.
C. Shen et al., "MiLift: Efficient Smartwatch-based Workout Tracking Using Automatic Segmentation," IEEE Transactions on Mobile Computing, vol. 17, No. 7, Jul. 2018, 14 pages.
Simply Shredded, "The Need for Speed: Accelerate your Muscle Growth by Manipulating the Speed of your Reps," https://tinyurl.com/Inwm3sy, Accessed Oct. 21, 2022, 18 pages.
A. Soro et al., "Recognition and Repetition Counting for Complex Physical Exercises with Deep Learning," Sensors, vol. 19, No. 3, Feb. 10, 2019, 22 pages.
Spotebi, "Chest Exercises At Home Workouts For Women," https://www.spotebi.com/exercise-guide/chest- exercises/, Accessed Oct. 21, 2022, 6 pages.
B.-G. Yeo et al., "The Effects of Elbow Joint Angle and Resistance Point on Muscle Activation of the Contralateral Shoulder Muscles while Performing the Ulnar Thrust PNF Pattern Exercise," Journal of the Korean Society of Physical Medicine, vol. 10, No. 3, Aug. 2015, pp. 101-108.
Polytec Gmbh, "VibroGo," https://www.polytec.com/eu/vibrometry/products/single-point-vibrometers/vibrogo, Accessed Oct. 21, 2022, 23 pages.
A. L. May et al., "Obesity—United States, 1999-2010," Centers for Disease Control and Prevention, Morbidity and Mortality Weekly Report, Nov. 22, 2013, 13 pages.
G. Seketa et al., "Real-Time Evaluation of Repetitive Physical Exercise Using Orientation Estimation from Inertial and Magnetic Sensors," First European Biomedical Engineering Conference for Young Investigators, Jan. 2015, pp. 11-14.
C. Zhang et al., "FingOrbits: Interaction with Wearables Using Synchronized Thumb Movements," ACM International Symposium on Wearable Computers, Sep. 2017, pp. 62-65.
Y. Zhang et al., "Wearing-independent Hand Gesture Recognition Method Based on EMG Armband," Personal and Ubiquitous Computing, vol. 22, May 11, 2018, pp. 511-524.
Y. Avargel et al., "Speech Measurements Using a Laser Doppler Vibrometer Sensor: Application to Speech Enhancement," 2011

(56) References Cited

OTHER PUBLICATIONS

Joint Workshop on Hands-free Speech Communication and Microphone Arrays, Jun. 2011, pp. 109-114.
K.-Y. Chen et al., "DOSE: Detecting User-Driven Operating States of Electronic Devices from a Single Sensing Point," IEEE International Conference on Pervasive Computing and Communications, Mar. 2015, pp. 46-54.
A. Bonde et al., "Demo Abstract: Deskbuddy: an Office Activity Detection System," Proceedings of the 18th International Conference on Information Processing in Sensor Networks, Apr. 2019, pp. 352-353.
G. Cohn et al., "GasSense: Appliance-Level, Single-Point Sensing of Gas Activity in the Home," International Conference on Pervasive Computing, Apr. 2010, pp. 265-282.
G. Cohn et al., "An Ultra-Low-Power Human Body Motion Sensor Using Static Electric Field Sensing, " Proceedings of the 2012 ACM Conference on Ubiquitous Computing, Sep. 2012, pp. 99-102.
A. Davis et al., "Visual Vibrometry: Estimating Material Properties from Small Motions in Video," IEEE Transactions on Pattern Analysis and Machine Intelligence, vol. 39, No. 4, Apr. 2017, pp. 732-745.
A. Davis et al., "The Visual Microphone: Passive Recovery of Sound from Video," ACM Transactions on Graphics, vol. 33, No. 4, Jul. 2014, 10 pages.
J. Fagert et al., "Monitoring Hand-Washing Practices Using Structural Vibrations," Proceedings of Structural Health Monitoring, May 2017, 10 pages.
J. Fogarty et al., "Sensing from the Basement: A Feasibility Study of Unobtrusive and Low-Cost Home Activity Recognition," Proceedings of the 19th Annual ACM Symposium on User Interface Software and Technology, Oct. 2006, pp. 91-100.
J. Froehlich et al., "HydroSense: Infrastructure-Mediated Single-Point Sensing of Whole-Home Water Activity," Proceedings of the 11th International Conference on Ubiquitous Computing, Sep. 2009, pp. 235-244.
D. Goyal et al., "The Vibration Monitoring Methods and Signal Processing Techniques for Structural Health Monitoring: A Review," Archives of Computational Methods in Engineering, vol. 23, pp. 585-594.
S. Gupta et al., "ElectriSense: Single-Point Sensing Using EMI for Electrical Event Detection and Classification in the Home," Proceedings of the 12th ACM International Conference on Ubiquitous Computing, Sep. 2010, pp. 139-148.
T. He et al., "Bag of Tricks for Image Classification with Convolutional Neural Networks," IEEE/CVF Conference on Computer Vision and Pattern Recognition, Dec. 4, 2018, pp. 558-567.
A. M. Huber et al., "Evaluation of Eardrum Laser Doppler Interferometry as a Diagnostic Tool," The Laryngoscope, vol. 111, No. 3, Mar. 2001, pp. 501-507.
Y. Kim et al., "ViridiScope: Design and Implementation of a Fine Grained Power Monitoring System for Homes," Proceedings of the 11th ACM International Conference on Ubiquitous Computing, Sep. 2009, pp. 245-254.
S. Kuznetsov et al., "UpStream: Motivating Water Conservation with Low-Cost Water Flow Sensing and Persuasive Displays," Proceedings of the SIGCHI Conference on Human Factors in Computing Systems, Apr. 2010, pp. 1851-1860.
G. Laput et al., "Ubicoustics: Plug-and-Play Acoustic Activity Recognition," Proceedings of the 31st Annual ACM Symposium on User Interface Software and Technology, Oct. 2018, pp. 213-224.
G. Laput et al., "Zensors: Adaptive, Rapidly Deployable, Human-Intelligent Sensor Feeds," Proceedings of the 33rd Annual ACM Conference on Human Factors in Computing Systems, Apr. 2015, 10 pages.
G. Laput et al., "Synthetic Sensors: Towards General-Purpose Sensing," Proceedings of the 2017 CHI Conference on Human Factors in Computing Systems, May 2017, 14 pages.
S. Li et al., "WiFit: Ubiquitous Bodyweight Exercise Monitoring with Commodity Wi-Fi Devices," IEEE SmartWorld, Ubiquitous Intelligence & Computing, Advanced & Trusted Computing, Scalable Computing & Communications, Cloud & Big Data Computing, Internet of People and Smart City Innovation, Oct. 2018, pp. 530-537.
G. Luo et al., "Wavelet Denoising," Chapter 4, Advances in Wavelet Theory and Their Applications in Engineering, Physics and Technology, Apr. 2012, 23 pages.
M. Mirshekari et al., "Human Gait Monitoring Using Footstep-Induced Floor Vibrations Across Different Structures," Proceedings of the 2018 ACM International Joint Conference and 2018 International Symposium on Pervasive and Ubiquitous Computing and Wearable Computers, Oct. 2018, pp. 1382-1391.
International Search Report of PCT/US2021/029189, Aug. 17, 2021, 2 pages.
Yeo et al., "Opisthenar: Hand Poses and Finger Tapping Recognition by Observing Back of Hand Using Embedded Wrist Camera," UIST'19, Association of Computing Machinery, Oct. 20-23, 2019, pp. 963-971.
O. Amft et al., "Detection of Eating and Drinking Arm Gestures Using Inertial Body-Worn Sensors," IEEE International Symposium on Wearable Computers, 2005, pp. 160-163.
M. Andriluka et al., "Pictorial Structures Revisited: People Detection and Articulated Pose Estimation," IEEE Conference on Computer Vision and Pattern Recognition, 2009, pp. 1014-1021.
F. Attal et al., "Physical Human Activity Recognition Using Wearable Sensors," Sensors, vol. 15, No. 12, Dec. 12, 2015, pp. 31314-31338.
A. Bedri et al., "A Wearable System for Detecting Eating Activities with Proximity Sensors in the Outer Ear," Proceedings of the 2015 ACM International Symposium on Wearable Computers, Sep. 7-11, 2015, pp. 91-92.
Y. Bi et al., "Autodietary: A Wearable Acoustic Sensor System for Food Intake Recognition in Daily Life," IEEE Sensors Journal, vol. 16, No. 3, Feb. 1, 2016, pp. 806-816.
J. Cawley et al., "The Medical Care Costs of Obesity: An Instrumental Variables Approach," NBER Working Paper Series, Oct. 2010, 42 pages.
J. Denavit et al., "A Kinematic Notation for Lower-Pair Mechanisms Based on Matrices," Journal of Applied Mechanics, Jun. 1955, pp. 215-221.
Y. Dong et al., "Detecting Periods of Eating During Free-Living by Tracking Wrist Motion," IEEE Journal Of Biomedical And Health Informatics, vol. 18, No. 4, 2013, pp. 1253-1260.
C. M. Hales, "Prevalence of Obesity Among Adults and Youth: United States, 2015-2016," NCHS Data Brief, No. 288, Oct. 2017, 8 pages.
N. Y. Hammerla et al., "Deep, Convolutional, and Recurrent Models for Human Activity Recognition Using Wearables," arXiv:1604.08880v1, Apr. 29, 2016, 7 pages.
T. Albert Henry, "Adult Obesity Rates Rise in 6 States, Exceed 35% in 7," American Medical Association, https://www.ama-assn.org/delivering-care/public-health/adult-obesity-rates-rise-6-states-exceed-35-7, Nov. 26, 2018, 3 pages.
M. D. Jensen et al., "AHA/ACC/TOS Guideline for the Management of Overweight and Obesity in Adults: A Report of the American College of Cardiology/American Heart Association Task Force on Practice Guidelines and The Obesity Society," Journal of the American College of Cardiology, vol. 63, No. 25, Jul. 1, 2014, pp. 2985-3023.
A. M. Khan et al., "A Triaxial Accelerometer-Based Physical-Activity Recognition via Augmented-Signal Features and a Hierarchical Recognizer," IEEE Transactions on Information Technology in Biomedicine, vol. 14, No. 5, Sep. 2010, pp. 1166-1172.
M. Mirtchouk et al., "Recognizing Eating from Body-Worn Sensors: Combining Free-Living and Laboratory Data," Proceedings of the ACM on Interactive, Mobile, Wearable and Ubiquitous Technologies, vol. 1, No. 3, Article 85, Sep. 2017, 20 pages.
M. Mirtchouk et al., "Automated Estimation of Food Type and Amount Consumed from Body-Worn Audio and Motion Sensors," In Proceedings of the 2016 ACM International Joint Conference on Pervasive and Ubiquitous Computing, Sep. 12-16, 2016, pp. 451-462.

(56) References Cited

OTHER PUBLICATIONS

J. C. Perry et al., "Design of a 7 Degree-of-Freedom Upper-Limb Powered Exoskeleton," In The First IEEE/RAS-EMBS International Conference on Biomedical Robotics and Biomechatronics, 2006, pp. 805-810.

L. Piyathilaka et al., "Gaussian Mixture Based HMM for Human Daily Activity Recognition Using 3D Skeleton Features," IEEE 8th Conference On Industrial Electronics And Applications, Jul. 2013, pp. 567-572.

S. A. Rahman et al., "Unintrusive Eating Recognition Using Google Glass," In 9th International Conference on Pervasive Computing Technologies for Healthcare, 2015, pp. 108-111.

R. I. Ramos-Garcia et al., "Improving the Recognition Of Eating Gestures Using Intergesture Sequential Dependencies," IEEE Journal of Biomedical and Health Informatics, vol. 19, No. 3, May 2015, pp. 825-831.

J. L. Scisco et al., "Examining the Utility of a Bite-Count-Based Measure of Eating Activity in Free-Living Human Beings," Journal of the Academy of Nutrition and Dietetics, Sep. 3, 2013, 6 pages.

S. Shen et al., "I am a Smartwatch and I Can Track My User's Arm," In Proceedings of the 14th Annual International Conference on Mobile Systems, Applications, And Services, Jun. 25-30, 2016, pp. 85-96.

E. Thomaz et al., "A Practical Approach for Recognizing Eating Moments with Wrist-Mounted Inertial Sensing," In Proceedings of the ACM International Joint Conference on Pervasive and Ubiquitous Computing, Sep. 2015, pp. 1029-1040.

X. Ye et al., "Assisting Food Journaling with Automatic Eating Detection," In Proceedings of the 2016 CHI Conference Extended Abstracts on Human Factors in Computing Systems, May 7-12, 2016, pp. 3255-3262.

S. Zhang et al., "I Sense Overeating: Motif-based Machine Learning Framework to Detect Overeating Using Wrist-worn Sensing," Procedia Computer Science, vol. 00, 2017, pp. 1-16.

C. A. Ronao et al., "Human Activity Recognition with Smartphone Sensors Using Deep Learning Neural Networks," Expert Systems With Applications, vol. 59, Apr. 26, 2016, pp. 235-244.

H. Junker et al., "Gesture Spotting with Body-Worn Inertial Sensors to Detect User Activities," Pattern Recognition vol. 41, 2008, pp. 2010-2024.

I. Akhter et al., "Pose-Conditioned Joint Angle Limits for 3D Human Pose Reconstruction," IEEE Conference on Computer Vision and Pattern Recognition, 2015, pp. 1446-1455.

C. Xu et al., "Finger-writing with Smartwatch: A Case for Finger and Hand Gesture Recognition using Smartwatch," Proceedings of the 16th International Workshop on Mobile Computing Systems and Applications, Feb. 2015, pp. 9-14.

A. Vardy et al., "The WristCam as Input Device," International Symposium on Wearable Computers, Oct. 1999, 4 pages.

H. Su et al., "Multi-view Convolutional Neural Networks for 3D Shape Recognition," Proceedings of IEEE International Conference on Computer Vision, Dec. 2015, pp. 945-953.

C. Qian et al., "Realtime and Robust Hand Tracking from Depth," IEEE Conference on Computer Vision and Pattern Recognition, Jun. 23, 2014, 8 pages.

J. McIntosh et al., "EchoFlex: Hand Gesture Recognition Using Ultrasound Imaging," CHI Conference on Human Factors in Computing Systems, May 2017, pp. 1923-1934.

J. Kim et al., "The Gesture Watch: A Wireless Contact-free Gesture based Wrist Interface," International Symposium on Wearable Computers, Oct. 2007, 9 pages.

U. Iqbal et al., "Hand Pose Estimation via Latent 2.5D Heatmap Regression," European Conference on Computer Vision, Sep. 2018, 17 pages.

P. J. Huber, "Robust Estimation of a Location Parameter," Annals of Mathematical Statistics, vol. 335, No. 1, Mar. 1964, pp. 73-101.

C. Zimmermann et al., "Learning to Estimate 3D Hand Pose from Single RGB Images," Proceedings of the IEEE International Conference on Computer Vision, Oct. 2017, pp. 4903-4911.

Y. Zhao et al., "Demo: Finger and Hand Gesture Recognition using Smartwatch," 13th Annual International Conference on Mobile Systems, Applications, and Services, May 18, 2015, p. 471.

J. Tompson et al., "Real-Time Continuous Pose Recovery of Human Hands Using Convolutional Networks," ACM Transactions on Graphics, vol. 33, No. 5, Aug. 2014, 10 pages.

J. Taylor et al. "Efficient and Precise Interactive Hand Tracking Through Joint, Continuous Optimization of Pose and Correspondences," ACM Transactions on Graphics, vol. 35, No. 4, Jul. 2016, 12 pages.

L. Sun et al., "WiDraw: Enabling Hands-free Drawing in the Air on Commodity WiFi Devices," Proceedings of the 21st Annual International Conference on Mobile Computing and Networking, Sep. 2015, 13 pages.

T. Stamer et al., "Real-Time American Sign Language Recognition Using Desk and Wearable Computer Based Video," IEEE Transactions on Pattern Analysis and Machine Intelligence, vol. 20, No. 12, Dec. 1998, pp. 1371-1375.

N. Srivastava et al., "Dropout: A Simple Way to Prevent Neural Networks from Overfitting," Journal of Machine Learning Research, vol. 15, Jun. 2014, pp. 1929-1958.

S. Sridhar et al., "WatchSense: On- and Above-Skin Input Sensing through a Wearable Depth Sensor," CHI Conference on Human Factors in Computing Systems, May 2017, pp. 3891-3902.

A. Spurr et al., "Cross-modal Deep Variational Hand Pose Estimation," Proceedings of the IEEE Conference on Computer Vision and Pattern Recognition, Jun. 2018, pp. 89-98.

T. Simon et al., "Hand Keypoint Detection in Single Images using Multiview Bootstrapping," Proceedings of the IEEE conference on Computer Vision and Pattern Recognition, Jul. 2017, pp. 1145-1153.

T. Sharp et al., "Accurate, Robust, and Flexible Realtime Hand Tracking," Proceedings of the 33rd Annual ACM Conference on Human Factors in Computing Systems, Apr. 2015, 10 pages.

O. Russakovsky et al., "ImageNet Large Scale Visual Recognition Challenge," arXiv:1409.0575v3, Jan. 30, 2015, 43 pages.

J. Romero et al., "Embodied Hands: Modeling and Capturing Hands and Bodies Together," ACM Transactions on Graphics, arXiv:2201.02610v1, Jan. 7, 2022, 19 pages.

M. Mirshekari et al., "Poster Abstract : Non-intrusive Occupant Localization Using Floor Vibrations in Dispersive Structure," Proceedings of the 14th ACM Conference on Embedded Network Sensor Systems, Nov. 2016, pp. 378-379.

P. G. G. Muyshondt et al., "A Single-Ossicle Ear: Acoustic Response and Mechanical Properties Measured in Duck," Hearing Research, vol. 340, Oct. 2016, 13 pages.

K. Ohara et al., "Detecting State Changes Of Indoor Everyday Objects Using Wi-Fi Channel State Information," Proceedings of the ACM on Interactive, Mobile, Wearable and Ubiquitous Technologies, vol. 1, No. 3, Sep. 2017, 28 pages.

S. Pan et al., "Fine-Grained Recognition of Activities of Daily Living through Structural Vibration and Electrical Sensing," Proceedings of the 6th ACM International Conference on Systems for Energy-Efficient Buildings, Cities, and Transportation, Nov. 2019, pp. 149-158.

S. Pan et al., "FootprintID: Indoor Pedestrian Identification through Ambient Structural Vibration Sensing," Proceedings of the ACM on Interactive, Mobile, Wearable and Ubiquitous Technologies, vol. 1, No. 3, Sep. 2017, 31 pages.

S. N. Patel et al., "Detecting Human Movement by Differential Air Pressure Sensing in HVAC System Ductwork: An Exploration in Infrastructure Mediated Sensing," International Conference on Pervasive Computing, May 2008, 18 pages.

S. N. Patel et al., "At the Flick of a Switch: Detecting and Classifying Unique Electrical Events on the Residential Power Line," International Conference on Ubiquitous Computing, Sep. 2007, pp. 271-288.

Q. Pu et al., "Whole-Home Gesture Recognition Using Wireless Signals," Proceedings of the 19th Annual International Conference on Mobile Computing & Networking, Sep. 2013, 13 pages.

M. Rohrbach et al., "A Database for Fine Grained Activity Detection of Cooking Activities," IEEE Conference on Computer Vision and Pattern Recognition, Jun. 2012, 8 pages.

(56) References Cited

OTHER PUBLICATIONS

N. B. Roozen et al., "Determining Radiated Sound Power of Building Structures by Means of Laser Doppler Vibrometry," Journal of Sound and Vibration, vol. 346, Jun. 23, 2015, 37 pages.
S. J. Rothberg et al., "An International Review of Laser Doppler Vibrometry: Making Light Work of Vibration Measurement," Optics and Lasers in Engineering, vol. 99, Dec. 2017, 35 pages.
L. Shi et al., "Device-free Multiple People Localization through Floor Vibration," Proceedings of the 1st ACM International Workshop on Device-Free Human Sensing, Nov. 2019, pp. 57-61.
L. Shi et al., "Data Quality-Informed Multiple Occupant Localization using Floor Vibration Sensing," Proceedings of the 21st International Workshop on Mobile Computing Systems and Applications, Mar. 2020, p. 98.
J. R. Smith et al., "RFID-Based Techniques for Human-Activity Detection," Communications of the ACM, vol. 28, No. 9, Sep. 2005, pp. 39-44.
A. Spielberg et al., "RapID: A Framework for Fabricating Low-Latency Interactive Objects with RFID Tags," Proceedings of the 2016 CHI Conference on Human Factors in Computing Systems, May 2016, 12 pages.
J. Sung et al., "Unstructured Human Activity Detection from RGBD Images," arXiv:1107.0169v2, Feb. 14, 2012, 8 pages.
H. Tabatabai et al., "Novel Applications of Laser Doppler Vibration Measurements to Medical Imaging," Sensing and Imaging: An International Journal, vol. 14, Aug. 13, 2013, pp. 13-28.
E. M. Tapia et al., "Activity Recognition in the Home Setting Using Simple and Ubiquitous Sensors," International Conference on Pervasive Computing, Apr. 2004, 18 pages.
A. A. Veber et al., "Laser Vibrometry Based on Analysis of the Speckle Pattern from a Remote Object," Applied Physics B, vol. 105, Jun. 4, 2011, pp. 613-617.
J. F. Vignola et al., "Characterization of Silicon Micro-Oscillators by Scanning Laser Vibrometry," Review of Scientific Instruments, vol. 73, No. 10, Oct. 2002, pp. 3584-3588.
H. Wang et al., "Human Respiration Detection with Commodity WiFi Devices: Do User Location and Body Orientation Matter?" Proceedings of the 2016 ACM International Joint Conference on Pervasive and Ubiquitous Computing, Sep. 2016, pp. 25-36.
Z. Wang et al., "Wi-Fi CSI based Behavior Recognition: From Signals, Actions to Activities," IEEE Communications Magazine, vol. 56, No. 5, Nov. 2017, 10 pages.
D. Wilson et al., "Simultaneous Tracking and Activity Recognition (STAR) Using Many Anonymous, Binary Sensors," International Conference on Pervasive Computing, May 8, 2005, 18 pages.
J. Wu et al., "Automatic Class Discovery and One-Shot Interactions for Acoustic Activity Recognition," Proceedings of the 2020 CHI Conference on Human Factors in Computing Systems, Apr. 2020, pp. 1-14.
Z. Zalevsky et al., "Simultaneous Remote Extraction of Multiple Speech Sources and Heart Beats from Secondary Speckles Pattern," Optics Express, vol. 17, No. 24, Nov. 2009, 15 pages.
C. Zhang et al., "RGB-D Camera-based Daily Living Activity Recognition," Signal & Information Processing Association Annual Summit and Conference, Jan. 2012, 7 pages.
Y. Zhang et al., "Vibrosight: Long-Range Vibrometry for Smart Environment Sensing," The 31st Annual ACM Symposium on User Interface Software and Technology, Oct. 2018, 12 pages.
Y. Zhang et al., "Occupant Activity Level Estimation Using Floor Vibration," Proceedings of the 2018 ACM International Joint Conference and 2018 International Symposium on Pervasive and Ubiquitous Computing and Wearable Computers, Oct. 2018, pp. 1355-1363.
Y. Zhang et al., "Wall++ Room-Scale Interactive and Context-Aware Sensing," Proceedings of the 2018 CHI Conference on Human Factors in Computing Systems, Apr. 2018, 15 pages.
Z. Zhou et al., "Activity Analysis, Summarization, and Visualization for Indoor Human Activity Monitoring," IEEE Transactions on Circuits and Systems for Video Technology, vol. 18, No. 11, Nov. 2008, pp. 1489-1498.
H. Li et al., "IDSense: A Human Object Interaction Detection System Based on Passive UHF RFID," Proceedings of the 33rd Annual ACM Conference on Human Factors in Computing Systems, Apr. 2015, 10 pages.
M. Mirshekari et al., "Obstruction-Invariant Occupant Localization Using Footstep-induced Structural Vibrations," Mechanical Systems and Signal Processing, vol. 153, May 15, 2021, 19 pages.
E. M. Tapia et al., "Portable Wireless Sensors for Object Usage Sensing in the Home: Challenges and Practicalities," European Conference on Ambient Intelligence, Nov. 2007, 18 pages.
E. V. Añazco et al., "Smoking Activity Recognition Using a Single Wrist IMU and Deep Learning Light," Proceedings of the 2nd International Conference on Digital Signal Processing, Feb. 2018, pp. 48-51.
M. M. Hassan et al., "Human Activity Recognition from Body Sensor Data using Deep Learning," Journal of Medical Systems, vol. 42, Apr. 16, 2018, 8 pages.
Y. Liu et al., "From Action to Activity: Sensor-based Activity Recognition," Neurocomputing, vol. 181, Mar. 2016, pp. 108-115.
L. Mo et al., "Human Physical Activity Recognition Based on Computer Vision with Deep Learning Model," IEEE International Instrumentation and Measurement Technology Conference Proceedings, May 2016, 6 pages.
F. Ding et al., "TTBA: An RFID-based Tracking System for Two Basic Actions in Free-Weight Exercises," Proceedings of the 14th ACM International Symposium on QoS and Security for Wireless and Mobile Networks, Oct. 2018, pp. 7-14.
C. L. V. Lisboa et al., "A Study for Postural Evaluation and Movement Analysis of Individuals," 2016 XVIII Symposium on Virtual and Augmented Reality, Jun. 2016, pp. 122-126.
C. Zhang et al., "FingerPing: Recognizing Fine-grained Hand Poses using Active Acoustic On-body Sensing," Proceedings of the 2018 CHI Conference on Human Factors in Computing Systems, Apr. 2018, 10 pages.
T. Maekawa et al., "WristSense: Wrist-worn Sensor Device with Camera for Daily Activity Recognition," Mar. 2012, pp. 510-512.
K. Seo et al., "AirPincher: A Handheld Device for Recognizing Delicate Mid-Air Hand Gestures," Proceedings of the Adjunct Publication of the 27th Annual ACM symposium on User Interface Software and Technology, Oct. 2014, pp. 83-84.
R. Abbaszadeh et al., "Prediction of Watermelon Quality Based on Vibration Spectrum," Postharvest Biology and Technology, vol. 86, Dec. 2013, pp. 291-293.
J. R. M. Aerts et al., "Nonlinearity in Eardrum Vibration as a Function of Frequency and Sound Pressure," Hearing Research, vol. 263, May 2010, pp. 26-32.
D. Avrahami et al., "Below the Surface: Unobtrusive Activity Recognition for Work Surfaces using RF-radar Sensing," 23rd International Conference on Intelligent User Interfaces, Mar. 2018, pp. 439-451.
P. Castellini et al., "Laser Doppler Vibrometry: Development of Advanced Solutions Answering to Technology's Needs," Mechanical Systems and Signal Processing, vol. 20, Aug. 2006, pp. 1265-1285.
W. Ostachowicz et al., "50th Anniversary Article: Comparison Studies of Full Wavefield Signal Processing for Crack Detection," Strain, vol. 50, Jun. 25, 2014, pp. 275-291.
S. Shi et al., "Passive Detection of Situations from Ambient FM-radio Signals," Proceedings of the 2012 ACM Conference on Ubiquitous Computing, Sep. 2012, pp. 1049-1053.
W. J. Staszewski et al., "Structural Health Monitoring using Scanning Laser Vibrometry: I. Lamb Wave Sensing," Smart Materials and Structures, vol. 13, No. 2, Feb. 4, 2004, pp. 251-260.
X. Liu et al., "Wi-Sleep: Contactless Sleep Monitoring via WiFi Signals," IEEE Real-Time Systems Symposium, Dec. 2014, pp. 346-355.
Matrix, "The Ultimate: Matrix Creator," https://www.matrix.one/, Accessed Nov. 2, 2022, 14 pages.
Texas Instruments, "SimpleLink Multi-standard CC2650 SensorTag Kit Reference Design," https://www.ti.com/tool/TIDC-CC2650STK-SENSORTAG, Accessed Nov. 2, 2022, 6 pages.

(56) References Cited

OTHER PUBLICATIONS

E. Arroyo et al., "Waterbot: Exploring Feedback and Persuasive Techniques at the Sink," Proceedings of the SIGCHI Conference on Human Factors in Computing Systems, Apr. 2005, pp. 631-639.
H.-S. Yeo et al., "RadarCat: Radar Categorization for Input & Interaction," Proceedings of the 29th Annual Symposium on User Interface Software and Technology, Oct. 2016, pp. 833-841.
F. Hu et al., "FingerTrak: Continuous 3D Hand Pose Tracking by Deep Learning Hand Silhouettes Captured by Miniature Thermal Cameras on Wrist," Proceedings of the ACM on Interactive, Mobile, Wearable and Ubiquitous Technologies, vol. 4, No. 2, Jun. 2020, 24 pages.
I. Loshchilov et al., "SGDR: Stochastic Gradient Descent with Warm Restarts," Proceedings of the International Conference on Learning Representations, arXiv:1608.03983v5, May 3, 2017, 16 pages.
H. Liang et al., "AR in Hand: Egocentric Palm Pose Tracking and Gesture Recognition for Augmented Reality Applications," Proceedings of the 23rd ACM international conference on Multimedia, Oct. 2015, pp. 743-744.
H. Li et al., "Wristwash: Towards Automatic Handwashing Assessment Using a Wrist-worn Device," Proceedings of the 2018 ACM International Symposium on Wearable Computers, Oct. 2018, pp. 132-139.
W. Sun, "ThumbTrak: Recognizing Micro-finger Poses Using a Ring with Proximity Sensing," The ACM International Conference on Mobile Human-Computer Interaction, arXiv:2105.14680, Dec. 23, 2021, 16 pages.
D. A. Bowman et al., "Design and Evaluation of Menu Systems for Immersive Virtual Environments," Proceedings IEEE Virtual Reality, Mar. 2001, pp. 149-156.
M. Fan et al., "Eyelid Gestures on Mobile Devices for People with Motor Impairments," Proceedings of the 22nd International ACM SIGACCESS Conference on Computers and Accessibility, Oct. 2020, No. 15, 8 pages.
J. Gong et al., "Pyro: Thumb-Tip Gesture Recognition Using Pyroelectric Infrared Sensing," Proceedings of the 30th Annual ACM Symposium on User Interface Software and Technology, Oct. 2017, pp. 553-563.
D.-Y. Huang et al., "DigitSpace: Designing Thumb-to-Fingers Touch Interfaces for One-Handed and Eyes-Free Interactions," Proceedings of the 2016 CHI Conference on Human Factors in Computing Systems, May 2016, pp. 1526-1537.
M. Kianpisheh et al., "Face Recognition Assistant for People with Visual Impairments," Proceedings of the ACM on Interactive, Mobile, Wearable and Ubiquitous Technologies, Sep. 9, 2019, 26 pages.
Y. Kubo et al., "AudioTouch: Minimally Invasive Sensing of Micro-Gestures via Active Bio-Acoustic Sensing," Proceedings of the 21st International Conference on Human-Computer Interaction with Mobile Devices and Services, Oct. 2019, No. 36, 13 pages.
A. Kulshreshth et al., "Exploring the Usefulness of Finger-Based 3D Gesture Menu Selection," Proceedings of the SIGCHI Conference on Human Factors in Computing Systems, Apr. 2014, pp. 1093-1102.
F. M. Li et al., "FMT: A Wearable Camera-Based Object Tracking Memory Aid for Older Adults," Proceedings of the ACM on Interactive, Mobile, Wearable and Ubiquitous Technologies, Sep. 2019, 25 pages.
M. Li et al., "BrailleSketch: A Gesture-based Text Input Method for People with Visual Impairments," Proceedings of the 19th International ACM SIGACCESS Conference on Computers and Accessibility, Oct. 2017, pp. 12-21.
A. Mujibiya et al., "The Sound of Touch: On-body Touch and Gesture Sensing Based on Transdermal Ultrasound Propagation," Proceedings of the 2013 ACM International Conference on Interactive Tabletops and Surfaces, Oct. 2013, pp. 189-198.
S. Oney et al., "ZoomBoard: A Diminutive QWERTY Soft Keyboard Using Iterative Zooming for Ultra-Small Devices," Proceedings of the SIGCHI Conference on Human Factors in Computing Systems, Apr. 2013, pp. 2799-2802.
W. Sun et al., "TeethTap: Recognizing Discrete Teeth Gestures Using Motion and Acoustic Sensing on an Earpiece," 26th International Conference on Intelligent User Interfaces, arXiv:2102.12548v1, Feb. 24, 2021, 16 pages.
R. Zhang et al., "Eating Trak: Detecting Fine-grained Eating Moments in the Wild Using a Wrist-mounted IMU," Proceedings of the ACM on Human-Computer Interaction, vol. 6, No. MHCI, Sep. 2022, 22 pages.
O. Amft et al., "Analysis of Chewing Sounds for Dietary Monitoring," Proceedings of the 7th International Conference on Ubiquitous Computing, Sep. 2005, pp. 56-72.
A. Bedri et al., "FitByte: Automatic Diet Monitoring in Unconstrained Situations Using Multimodal Sensing on Eyeglasses," Proceedings of the 2020 CHI Conference on Human Factors in Computing Systems, Apr. 2020, 12 pages.
A. Bedri et al., "EarBit: Using Wearable Sensors to Detect Eating Episodes in Unconstrained Environments," Proceedings of the ACM on Interactive, Mobile, Wearable and Ubiquitous Technologies, vol. 1, No. 3, Sep. 2017, 20 pages.
A. Bedri et al., "Detecting Mastication: A Wearable Approach," Proceedings of the 2015 ACM on International Conference on Multimodal Interaction, Nov. 2015, pp. 247-250.
S. Bi et al., "Auracle: Detecting Eating Episodes with an Ear-mounted Sensor," Proceedings of the ACM on Interactive, Mobile, Wearable and Ubiquitous Technologies, vol. 2, No. 3, Sep. 2018, 27 pages.
F. Bogo et al., "Keep it SMPL: Automatic Estimation of 3D Human Pose and Shape from a Single Image," arXiv:1607.08128v1, Jul. 27, 2016, 18 pages.
Z. Cao et al., "Realtime Multi-Person 2D Pose Estimation using Part Affinity Fields," arXiv:1611.08050v2, Apr. 14, 2017, 9 pages.
X. Chen et al., "Articulated Pose Estimation by a Graphical Model with Image Dependent Pairwise Relations," arXiv:1407.3399v2, Nov. 4, 2014, 9 pages.
J. Chung et al., "A Glasses-type Wearable Device for Monitoring the Patterns of Food Intake and Facial Activity," Scientific Reports, vol. 7, No. 41690, Jan. 30, 2017, 8 pages.
E. Cippitelli et al., "A Human Activity Recognition System Using Skeleton Data from RGBD Sensors," Computational Intelligence and Neuroscience, Mar. 2016, 14 pages.
F. Cordeiro et al., "Barriers and Negative Nudges: Exploring Challenges in Food Journaling," Proceedings of the 33rd Annual ACM Conference on Human Factors in Computing Systems, Authors Manuscript, Feb. 16, 2016, 8 pages.
M. Farooq et al., "Segmentation and Characterization of Chewing Bouts by Monitoring Temporalis Muscle Using Smart Glasses with Piezoelectric Sensor," IEEE Journal of Biomedical and Health Informatics, Authors Manuscript, Nov. 1, 2018, 24 pages.
N. Fawaz et al., "Deep Learning for Time Series Classification: A Review," arXiv:1809.04356v4, May 14, 2019, 44 pages.
A. Filippeschi et al., "Survey of Motion Tracking Methods Based on Inertial Sensors: A Focus on Upper Limb Human Motion," Sensors, vol. 17, No. 6, Jun. 2017, 40 pages.
K. He et al., "Mask R-CNN," arXiv:1703.06870v3, Jan. 24, 2018, 12 pages.
Y. Huang et al., "Deep Inertial Poser: Learning to Reconstruct Human Pose from Sparse Inertial Measurements in Real Time," ACM Transactions on Graphics, vol. 37, No. 6, Nov. 2018, pp. 185:1-185:15.
K. Kyritsis et al., "End-to-end Learning for Measuring in-meal Eating Behavior from a Smartwatch," 40th Annual International Conference of the IEEE Engineering in Medicine and Biology Society, Oct. 2018, 4 pages.
K. Kyritsis et al., "Modeling Wrist Micromovements to Measure In-Meal Eating Behavior from Inertial Sensor Data," IEEE Journal of Biomedical and Health Informatics, Jan. 2019, 11 pages.
D. Mehta et al., "Single-Shot Multi-Person 3D Pose Estimation From Monocular RGB," arXiv:1712.03453v3, Aug. 28, 2018, 16 pages.

(56) References Cited

OTHER PUBLICATIONS

D. Mehta et al., "VNect: Real-time 3D Human Pose Estimation with a Single RGB Camera," arXiv:1705.01583v1, May 3, 2017, 13 pages.

M. Mirtchouk et al., "Automated Estimation of Food Type from Body-worn Audio and Motion Sensors in Free-Living Environments," Proceedings of Machine Learning Research, vol. 106, Aug. 1, 2019, 21 pages.

M. B. Morshed et al., "A Real-Time Eating Detection System for Capturing Eating Moments and Triggering Ecological Momentary Assessments to Obtain Further Context: System Development and Validation Study," JMIR Mhealth Uhealth, vol. 8, No. 12, Dec. 2020, 15 pages.

K. Murakami et al., "Eating Frequency Is Positively Associated with Overweight and Central Obesity in US Adults," The Journal of Nutrition, Dec. 1, 2015, 10 pages.

A. Newell et al., "Stacked Hourglass Networks for Human Pose Estimation," arXiv:1603.06937v2, Jul. 26, 2016, 17 pages.

S. Sharma et al., "Automatic Detection of Periods of Eating Using Wrist Motion Tracking," IEEE First Conference on Connected Health: Applications, Systems and Engineering Technologies, Jun. 2016, pp. 362-363.

S. Sharma et al., "The Impact of Walking and Resting on Wrist Motion for Automated Detection of Meals," ACM Transactions on Computing for Healthcare, vol. 1, No. 4, Sep. 2020, pp. 24:1-24:19.

Y. Shen et al., "The Impact of Quantity of Training Data on Recognition of Eating Gestures," arXiv:1812.04513v1, Dec. 11, 2018, 7 pages.

T. Shiratori et al., "Motion Capture from Body-Mounted Cameras," ACM Transactions on Graphics, Jul. 25, 2011, 10 pages.

S. Mashiyama et al., "Activity Recognition Using Low Resolution Infrared Array Sensor," IEEE International Conference on Communications, Jun. 2015, 6 pages.

A. M. Huber et al., "A New Implantable Middle Ear Hearing Device for Mixed Hearing Loss: A Feasibility Study in Human Temporal Bones," Otology & Neurotology, vol. 27, Dec. 2006, pp. 1104-1109.

H. Wang et al., "RT-Fall: A Real-Time and Contactless Fall Detection System with Commodity WiFi Devices," IEEE Transactions on Mobile Computing, vol. 16, No. 2, Feb. 2017, pp. 511-526.

L. Zipser et al., "Laser-scanning Vibrometry for Ultrasonic Transducer Development," Sensors and Actuators A: Physical, vol. 110, Feb. 2004, pp. 264-268.

S. Stankoski et al., "Smartwatch-Based Eating Detection: Data Selection for Machine Learning from Imbalanced Data with Imperfect Labels," Sensors, vol. 21, No. 5, Mar. 9, 2021, 25 pages.

B. Tekin et al., "Fusing 2D Uncertainty and 3D Cues for Monocular Body Pose Estimation," arXiv:1611.05708v3, Apr. 10, 2017, 13 pages.

E. Thomaz et al., "Feasibility of Identifying Eating Moments from First-Person Images Leveraging Human Computation," Proceedings of the 4th International SenseCam & Pervasive Imaging Conference, Nov. 2013, 8 pages.

J. Tompson et al., "Joint Training of a Convolutional Network and a Graphical Model for Human Pose Estimation," arXiv:1406.2984v2, Sep. 17, 2014, 9 pages.

A. Toshev et al., "DeepPose: Human Pose Estimation via Deep Neural Networks," arXiv:1312.4659v3, Aug. 20, 2014, 9 pages.

T. Von Marcard et al., "Sparse Inertial Poser: Automatic 3D Human Pose Estimation from Sparse IMUs," Eurographics, vol. 36, No. 2, May 2017, pp. 349-360.

S.-E. Wei et al., "Convolutional Pose Machines," IEEE Conference on Computer Vision and Pattern Recognition, Jun. 2016, pp. 4724-4732.

L. Xie et al., "Data-driven Motion Estimation with Low-Cost Sensors," 5th International Conference on Visual Information Engineering, Jul. 2008, 6 pages.

K. Yatani et al., "BodyScope: A Wearable Acoustic Sensor for Activity Recognition," Proceedings of the 2012 ACM Conference on Ubiquitous Computing, Sep. 2012, pp. 341-350.

Y. Yokokohji et al., "Motion Capture from Demonstrator's Viewpoint and Its Application to Robot Teaching," IEEE International Conference on Robotics and Automation, May 2002, pp. 1551-1558.

R. Zhang et al., "Retrieval and Timing Performance of Chewing-Based Eating Event Detection in Wearable Sensors," Sensors, vol. 20, No. 2, Jan. 20, 2020.

R. Zhang et al., "Diet Eyeglasses: Recognising Food Chewing Using EMG and Smart Eyeglasses," 13th International Conference on Wearable and Implantable Body Sensor Networks, Jun. 2016, 6 pages.

S. Zhang et al., "When Generalized Eating Detection Machine Learning Models Fail in the Field," Proceedings of the 2017 ACM International Joint Conference on Pervasive and Ubiquitous Computing and Proceedings of the 2017 ACM International Symposium on Wearable Computers, Sep. 2017, pp. 613-622.

S. Zhang et al., "NeckSense: A Multi-Sensor Necklace for Detecting Eating Activities in Free-Living Conditions," Proceedings of the ACM on Interactive, Mobile, Wearable and Ubiquitous Technologies, vol. 4, No. 2, Jun. 2020, 47 pages.

X. Zhou et al., "Sparseness Meets Deepness: 3D Human Pose Estimation from Monocular Video," IEEE Conference on Computer Vision and Pattern Recognition, Jun. 2016, pp. 4966-4975.

W. Sun et al., "Vibrosense: Recognizing Home Activities by Deep Learning Subtle Vibrations on an Interior Surface of a House from a Single Point Using Laser Doppler Vibrometry," Proceedings of The ACM on Interactive, Mobile, Wearable and Ubiquitous Technologies, vol. 4, No. 3, Sep. 2020, pp. 96:1-96:28.

Y. Y. Luktuke et al., "Segmentation and Recognition of Eating Gestures from Wrist Motion using Deep Learning," 2020 IEEE International Conference on Big Data, Dec. 2020, pp. 1368-1373.

J. C. Núñez et al., "Convolutional Neural Networks and Long Short-Term Memory for Skeleton-Based Human Activity and Hand Gesture Recognition," Pattern Recognition, vol. 76, Apr. 2018, pp. 80-94.

W. Wei et al., "Real-Time 3D Arm Motion Tracking Using the 6-Axis IMU Sensor of a Smartwatch," 17th International Conference on Wearable And Implantable Body Sensor Networks, Jul. 2021, 4 pages.

R. Zhang et al., "Monitoring Chewing and Eating in Free-Living Using Smart Eyeglasses," IEEE Journal of Biomedical and Health Informatics, vol. 22, No. 1, Jan. 2018, pp. 23-32.

R. Zhang et al., "Free-living Eating Event Spotting using EMG-monitoring Eyeglasses," IEEE EMBS International Conference on Biomedical & Health Informatics, Mar. 2018, pp. 128-132.

J. D. Achenbach, "Wave Propagation in Elastic Solids," Elsevier, Jan. 1973, 18 pages. Description and Table of Contents Only.

J. Fagert et al., Vibration Source Separation for Multiple People Gait Monitoring Using Footstep-Induced Floor Vibrations, Structural Health Monitoring, DOI 10.12783/shm2019/32338, Nov. 15, 2019, 1 page. Abstract Only.

A. Jalal et al., "Robust Human Activity Recognition from Depth Video Using Spatiotemporal Multi-fused Features," Pattern Recognition, vol. 61, Jan. 2017, pp. 295-308.

D. Ashbrook et al., "Nenya: Subtle and Eyes-Free Mobile Input with a Magnetically-Tracked Finger Ring," Proceedings of the SIGCHI Conference on Human Factors in Computing Systems, May 2011, pp. 2043-2046.

L. Chan et al., "CyclopsRing: Enabling Whole-Hand and Context-Aware Interactions Through a Fisheye Ring," Proceedings of the 28th Annual ACM Symposium on User Interface Software & Technology, Nov. 5, 2015, 8 pages.

K.-Y. Chen et al., "uTrack: 3D Input Using Two Magnetic Sensors," Proceedings of the 26th Annual ACM Symposium on User Interface Software & Technology, Oct. 2013, pp. 237-244.

A. Dementyev et al., "WristFlex: Low-Power Gesture Input with Wrist-Worn Pressure Sensors," Proceedings of the 27th Annual ACM Symposium on User Interface Software and Technology, Oct. 2014, 6 pages.

T. Deyle et al., "Hambone: A Bio-Acoustic Gesture Interface," International Symposium on Wearable Computers, Oct. 2007, 8 pages.

(56) References Cited

OTHER PUBLICATIONS

R. Fukui et al., "Hand Shape Classification with a Wrist Contour Sensor: Development of a Prototype Device," Proceedings of the 13th International Conference on Ubiquitous Computing, Sep. 2011, pp. 311-314.
J. Gong et al., "WristWhirl: One-handed Continuous Smartwatch Input using Wrist Gestures," Proceedings of the 29th Annual Symposium on User Interface Software and Technology, Oct. 16, 2016, 12 pages.
A. Gupta et al., "RotoSwype:Word-Gesture Typing using a Ring," Proceedings of the 2019 CHI Conference on Human Factors in Computing Systems, May 2, 2019, 12 pages.
C. Harrison et al., "Skinput: Appropriating the Body as an Input Surface," Proceedings of the SIGCHI Conference on Human Factors in Computing Systems, Apr. 2010, pp. 453-462.
W. Kienzle et al., "LightRing: Always-Available 2D Input on Any Surface," Proceedings of the 27th Annual ACM Symposium on User Interface Software and Technology, Oct. 2014, 4 pages.
G. Laput et al., "ViBand: High-Fidelity Bio-Acoustic Sensing Using Commodity Smartwatch Accelerometers," Proceedings of the 29th Annual Symposium on User Interface Software and Technology, Oct. 16, 2016, 13 pages.
C. Loclair et al., "PinchWatch: A Wearable Device for One-Handed Microinteractions," 12th International Conference on Human Computer Interaction with Mobile Devices and Services, Sep. 2010, 4 pages.
Z. Lu et al., "A Hand Gesture Recognition Framework and Wearable Gesture-Based Interaction Prototype for Mobile Devices," IEEE Transactions on Human-Machine Systems, vol. 44, No. 2, Apr. 2014, pp. 293-299.
M. Ogata et al., "iRing: Intelligent Ring Using Infrared Reflection," Proceedings of the 25th Annual ACM Symposium on User Interface Software and Technology, Oct. 2012, pp. 131-136.
T. S. Saponas et al., "Enabling Always-Available Input with Muscle-Computer Interfaces," Proceedings of the 22nd Annual ACM Symposium on User Interface Software and Technology, Oct. 2009, pp. 167-176.
D. Way et al., "A Usability User Study Concerning Free-Hand Microgesture and Wrist-Worn Sensors," 11th International Conference on Wearable and Implantable Body Sensor Networks, Jun. 16, 2014, pp. 138-142.
H. Wen et al., "Serendipity: Finger Gesture Recognition using an Off-the-Shelf Smartwatch," Proceedings of the 2016 CHI Conference on Human Factors in Computing Systems, May 7, 2016, pp. 3847-3851.
C. Zhang et al., "FingerSound: Recognizing Unistroke Thumb Gestures Using a Ring," Proceedings of the ACM on Interactive, Mobile, Wearable and Ubiquitous Technologies, vol. 1, No. 3, Sep. 2017, pp. 120:1-120:19.
Y. Zhang et al., "Tomo: Wearable, Low-Cost Electrical Impedance Tomography for Hand Gesture Recognition," Proceedings of the 28th Annual ACM Symposium on User Interface Software & Technology, Nov. 5, 2015, pp. 167-173.
Y. Zhang et al., "Advancing Hand Gesture Recognition with High Resolution Electrical Impedance Tomography," Proceedings of the 29th Annual Symposium on User Interface Software and Technology, Oct. 2016, pp. 843-850.
Y. Zhang et al., "SkinTrack: Using the Body as an Electrical Waveguide for Continuous Finger Tracking on the Skin," Proceedings of the 2016 CHI Conference on Human Factors in Computing Systems, May 2016, pp. 1491-1503.
G. Bailly et al., "ShoeSense: A New Perspective on Hand Gestures and Wearable Applications," Proceedings of the SIGCHI Conference on Human Factors in Computing Systems, May 2012, pp. 1239-1248.
K.-M. Cheung et al., "Shape-From-Silhouette Across Time Part I: Theory and Algorithms," International Journal of Computer Vision, vol. 62, Nov. 1, 2004, 51 pages.

K.-M. Cheung et al., "Shape-From-Silhouette Across Time Part II: Applications to Human Modeling and Markerless Motion Tracking," International Journal of Computer Vision, vol. 63, Apr. 1, 2005, 39 pages.
L. Ballan et al., "Motion Capture of Hands in Action using Discriminative Salient Points," European Conference on Computer Vision, Oct. 2012, 14 pages.
B. G. Baumgart, "Geometric Modeling for Computer Vision," Technical Report, Stanford University, Prepared for Office of Naval Research, Oct. 1974, 144 pages.
J.-B. Chossat et al., "Wearable Soft Artificial Skin for Hand Motion Detection with Embedded Microfluidic Strain Sensing," IEEE International Conference on Robotics and Automation, May 2015, pp. 2568-2573.
S. Ciotti et al., "A Synergy-Based Optimally Designed Sensing Glove for Functional Grasp Recognition," Sensors, vol. 16, No. 811, Jun. 2, 2016, 17 pages.
J. Connolly et al., "IMU Sensor-Based Electronic Goniometric Glove for Clinical Finger Movement Analysis," IEEE Sensors Journal, vol. 18, No. 3, Feb. 1, 2018, 8 pages.
M. De La Gorce et al., "Model-Based 3D Hand Pose Estimation from Monocular Video," IEEE Transactions on Pattern Analysis and Machine Intelligence, Sep. 1, 2011, 15 pages.
G. Du et al., "Markerless Kinect-Based Hand Tracking for Robot Teleoperation," International Journal of Advanced Robotic Systems, vol. 9, Jul. 13, 2012, 10 pages.
L. Ge et al., "Hand PointNet: 3D Hand Pose Estimation using Point Sets," Conference on Computer Vision and Pattern Recognition, Jun. 2018, pp. 8417-8426.
M. Datar et al., "Locality-Sensitive Hashing Scheme Based on p-Stable Distributions," Proceedings of the 20th Annual Symposium on Computational Geometry, Jun. 2004, pp. 253-262.
L. Ge et al., "3D Hand Shape and Pose Estimation from a Single RGB Image," Proceedings of the IEEE Conference on Computer Vision and Pattern Recognition, Jun. 2019, pp. 10833-10842.
F. Kerber et al., "User-Independent Real-Time Hand Gesture Recognition Based on Surface Electromyography," Proceedings of the 19th International Conference on Human-Computer Interaction with Mobile Devices and Services, Sep. 2017, 7 pages.
O. Glauser et al., "Interactive Hand Pose Estimation using a Stretch-Sensing Soft Glove," ACM Transactions on Graphics, vol. 38, No. 4, Jul. 2019, 15 pages.
O. Glauser et al., "A Stretch-Sensing Soft Glove for Interactive Hand Pose Estimation," ACM SIGGRAPH Emerging Technologies, Aug. 2019, 2 pages.
D. Kim et al., "Digits: Freehand 3D Interactions Anywhere Using a Wrist-worn Gloveless Sensor," Proceedings of the 25th Annual ACM Symposium on User Interface Software and Technology, Oct. 2012, pp. 167-176.
K. He et al., "Deep Residual Learning for Image Recognition," Proceedings of the IEEE Conference on Computer Vision and Pattern Recognition, arXiv:1512.03385v1, Dec. 10, 2015, 12 pages.
M. Holl et al., "Efficient Physics-Based Implementation for Realistic Hand-Object Interaction in Virtual Reality," IEEE Annual International Symposium Virtual Reality, Mar. 2018, 8 pages.
S. Ioffe et al., "Batch Normalization: Accelerating Deep Network Training by Reducing Internal Covariate Shift," arXiv:1502.03167v3, Mar. 2, 2015, 11 pages.
B. Kellogg et al., "Bringing Gesture Recognition to All Devices," 11th USENIX Symposium on Networked Systems Design and Implementation, Apr. 2014, pp. 303-316.
R. K. Kramer et al., "Soft Curvature Sensors for Joint Angle Proprioception," IEEE/RSJ International Conference on Intelligent Robots and Systems, Sep. 2011, 8 pages.
T. Li et al., "Reconstructing Hand Poses Using Visible Light," PACM on Interactive, Mobile, Wearable and Ubiquitous Technologies, vol. 1, No. 3, Article 71. Sep. 2017, 20 pages.
B.-S. Lin et al., "Design of an Inertial-Sensor-Based Data Glove for Hand Function Evaluation," Sensors, vol. 18, No. 1545, May 13, 2018, 17 pages.

(56) References Cited

OTHER PUBLICATIONS

K. Ohnishi et al., "Recognizing Activities of Daily Living with a Wrist-mounted Camera," Proceedings of the IEEE Conference on Computer Vision and Pattern Recognition, arXiv:1511.06783v2, Apr. 28, 2016, 14 pages.
I. Oikonomidis et al., "Efficient Model-based 3D Tracking of Hand Articulations using Kinect," Proceedings of the British Machine Vision Conference, Sep. 2011, 11 pages.
I. Oikonomidis et al., "Full DOF Tracking of a Hand Interacting with an Object by Modeling Occlusions and Physical Constraints," International Conference on Computer Vision, Nov. 2011, 8 pages.
C. R. Pittman et al., "Multiwave: Complex Hand Gesture Recognition Using the Doppler Effect," Proceedings of the 43rd Graphics Interface Conference, Jun. 2017, 7 pages.

\* cited by examiner

FIG. 4B Ground truth

FIG. 4D Prediction

DEEP CONTINUOUS 3D HAND POSE TRACKING

CROSS-REFERENCE TO RELATED APPLICATIONS

This application claims the benefit of U.S. Provisional Patent Application No. 63/015,381, filed Apr. 24, 2020, entitled "FINGERTRAK: DEEP CONTINUOUS 3D HAND POSE TRACKING," the contents of which is incorporated herein by reference in its entirety.

BACKGROUND

Hand gesture research has been an ongoing topic of study for many years. For example, studies involving Human Computer Interaction (HCI) have aimed to be able to recognize hand gestures through a variety of techniques. Many traditional hand pose estimation and gesture recognition technologies rely on computer vision using cameras in the environment to capture the hand pose. However, these systems do not work well if a hand moves outside the field of view of the camera.

Other techniques for estimating hand poses have been presented based upon wearable technology, such as wearing gloves or position sensors or markers on a hand. These devices are obtrusive, and in most cases, are only able to recognize a limited number of very discrete and pre-programmed hand poses.

It would be advantageous for a system to rely on non-obtrusive hardware to enable the system to continuously capture and recognize hand poses and gestures, including fine-grained finger gestures, that allows a user to move away from a fixed position.

These, and other advantages, will become apparent by reference to the following description and appended drawings.

SUMMARY

According to some embodiments, a system includes a wearable band configured to be coupled to an arm of a user; a first imaging sensor disposed on the wearable band, the first imaging sensor aimed to have a first field of view that is anatomically distal when the wearable band is coupled to the arm of the user; and wherein the first imaging sensor defines an optical axis, and wherein the optical axis is spaced a distance from the wearable band, the distance being less than 5 mm. Alternatively, the distance may be less than 4 mm, less than 6 mm, less than 7 mm, less than 8 mm, or less than 10 mm.

The system may further include a second imaging sensor disposed on the wearable band spaced from the first imaging sensor, the second imaging sensor aimed to have a second field of view that is anatomically distal when the wearable band is coupled to the arm of the user; and a third imaging sensor disposed on the wearable band spaced from the first imaging sensor the second imaging sensor, the third imaging sensor aimed to have a fourth field of view that is anatomically distal when the wearable band is coupled to the arm of the user. A fourth imaging sensors may similarly be disposed on the wearable band.

The first, second, and third imaging sensors may be aimed to include a hand of the user within the first, second, and third fields of view. The first, second, and third imaging sensors may optionally be aimed to have a converging field of view.

In some cases, the first, second, and third imaging sensors are substantially equally spaced about the wearable band. Optionally, a fourth imaging sensor may be integrated into the system, and the four imaging sensors may be equally spaced about the wearable band.

A computing device may be in communication with the first, second, and third imaging sensors and configured to receive image data from the imaging sensors corresponding to finger positions of the user. The communication may be wired or wireless.

In some examples, a stitching algorithm is executable by the computing device to stitch image data captured at a correlated time to create stitched images. In some examples, a 3D prediction module implementing a 3D prediction model executable by the computing device is configured to analyze the stitched images and determine a position of one or more fingertips of the user.

In some examples, a kinematic module implementing a kinematic model executable by the computing device is implemented to determine, based at least in part on the position of one or more fingertips, a position and orientation of hand joint angles. The hand joint angles may include one or more of a metacarpophalangeal joint angle, a proximal interphalangeal joint angle, a distal interphalangeal joint angle, and a radiocarpal joint angle.

According to some embodiments, a method includes the steps of receiving a first plurality of images from one or more imaging sensors located on an arm of a user, the first plurality of images captured at a same time and depicting a hand of the user, wherein the one or more imaging sensors each define an optical axis and wherein each optical axis is spaced from the arm of the user less than 8 mm; determining, based on the first plurality of images, a position of one or more fingertips of the user; and determining, based on the position of the one or more fingertips of the user, an estimation of a pose of the hand of the user.

The step of determining a position of one or more fingertips may be performed by a machine learning network (e.g., a convolution neural network). Optionally, the step of determining an estimation of a pose of the hand of the user may be performed by inference with a skeletal and kinematic model.

In some cases, the pose of the hand of the user includes one or more of a metacarpophalangeal joint angle, a proximal interphalangeal joint angle, a distal interphalangeal joint angle, and a radiocarpal joint angle.

The method may further include the steps of determining continuous hand tracking of the user by: receiving a second plurality of images from the plurality of imaging sensors, the second plurality of images captured at a second time; and determining an estimated pose of the hand of the user at the second time.

According to some embodiments, a method for tracking the position of a hand, includes receiving first images from one or more imaging sensors mounted to a wrist of a user; determining, based on the images, a 3D spatial position of one or more fingertips of the user; determining, based on the 3D spatial position of the one or more fingertips, a pose of the hand; receiving second images from the one or more imaging sensors mounted to the wrist of the user; and determining, based on one or more second images, a second pose of the hand.

The step of determining the 3D spatial position of one or more fingertips may be performed with a machine learning algorithm (e.g., a deep neural network). In some examples, the method further includes stitching together the images. The step of determining the pose of the hand may be performed, at least in part, on a kinematic model that infers the pose of the hand based, at least in part, on the 3D spatial position of the one or more fingertips.

Optionally, the method includes the step of determining, based at least in part on the second pose of the hand, a gesture.

BRIEF DESCRIPTION OF THE DRAWINGS

FIGS. 4A, 4B, 4C, and 4D illustrate steps of capturing images from a wrist-worn imaging sensor, including capturing ground truth, images from the wrist-worn imaging sensor, and a prediction of an actual hand pose, in accordance with some embodiments;

DETAILED DESCRIPTION

This disclosure generally relates to a non-obtrusive system for continuously estimating hand pose, gestures, and figure positions. The system may include one or more cameras that may continually capture images of a hand of a user. The system may be wrist-mounted and capture images from a location that is anatomically proximal of a user's hand. In some cases, the system uses one, two, three, four, six, eight, nine, ten, or more cameras located near a wrist of a user. In some embodiments, a single camera may be used to capture images of a hand of a user and infer hand poses and finger joint positions. In some cases, a single camera is located on the back of the wrist and captures images of the back of a user's hand, and from the images showing the back of the user's hand, the system can infer hand poses and finger positions with a high degree of accuracy. In some cases, the cameras are located close to the skin of a wearer, or close to the mount that attaches the system to a wrist of a user. In some cases, an optical axis of an imaging sensor is less than about 10 mm (mm=millimeter(s)) from the wrist of a user, or less than about 8 mm, or less than about 6 mm or less than about 4 mm, or less than about 2 mm from the skin of a user. In some cases, the optical axis of an imaging sensor is less than about 2 mm, or less than about 4 mm, or less than about 5 mm, or less than about 6 mm, or less than about 8 mm, or less than about 10 mm from a band that attaches the imaging sensor to a user.

According to some embodiments, a minimally obtrusive wristband includes one or more imaging sensors that allow for continuous three-dimensional finger tracking and micro finger pose recognition. In some cases, one or more imaging sensors may be used and may be disposed about a wrist mount.

Figure 1:
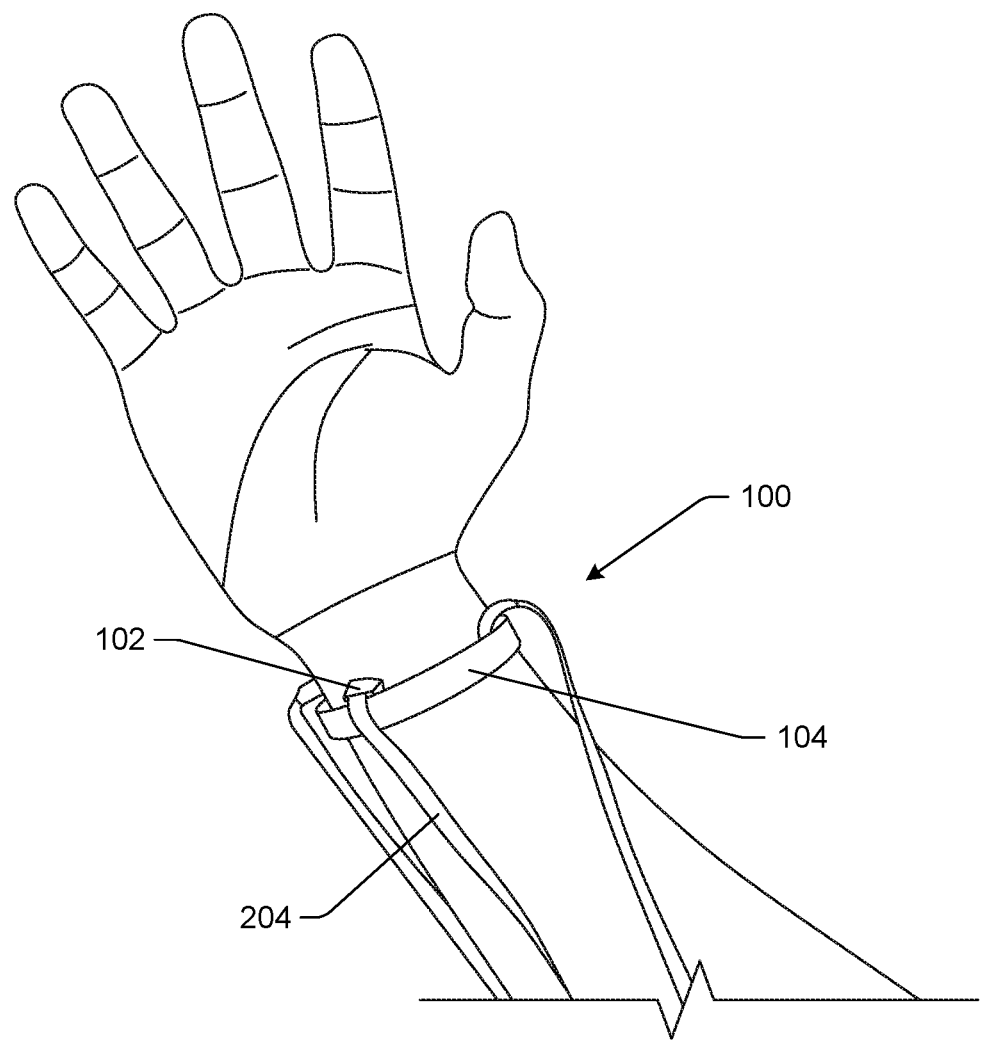
FIG. 1 illustrates an example human to computer interface that includes one or more cameras worn on a wrist of a user, in accordance with some embodiments.

FIG. 1 illustrates an embodiment of an example human to computer interface device 100 that includes one or more cameras 102 worn on a wrist of a user. While the illustrated embodiment shows multiple cameras 102, some embodiments may include one, two, three four, five, six, seven, eight, ten or more cameras located about a users' arm or wrist. In some cases, the one or more cameras 102 are located anatomically proximal of the wearer's hand and are aimed to capture images of a hand of the user. The cameras 102 may be coupled to a mount 104 for securing the device to a user. In some cases, the mount 104 may comprise a wristband 104.

The wristband 104 may be any suitable wristband, and may include, without limitation, an elastic or non-elastic band, and may be selectively coupled to a wearer by a releasable mechanism such as a buckle, a fastener, a snap, a clasp, a latch, hook and loop fastener, an elastomeric material, a living hinge, a spring, a biasing mechanism, or some other suitable mechanism for selectively coupling the mount to a user.

With all of the embodiments described herein, the imaging sensors 102 may be any suitable sensors for capturing images. For example, the imaging sensors 102 may include, without limitation, infrared (IR) imaging sensors, thermal imaging sensors, charge-coupled devices (CCD's), complementary metal oxide semiconductor (CMOS) devices, active-pixel sensors, radar imaging sensors, fiber optics, and other known imaging device technology. For ease in describing the various embodiments, the term "camera" will be used and is used as a broad term to include any type of sensor that can capture images whether in the visible spectrum or otherwise.

In some cases, the cameras 102 form a sensor array and the captured images (e.g., image data) from a plurality of cameras may be combined, such as by stitching, to form a stitched image that includes images (e.g., image data) from more than one camera 102.

In some cases, a sensor array may be mounted remotely from a wristband, and one or more optical fibers coupled to the wristband 104 may transmit images to the sensor array for processing, analysis, manipulation, or stitching.

In some cases, the one or more cameras 102 are low profile, meaning that they are relatively close to the mount, such as a wrist band 104, to which they are mounted. The images may be acquired at a selected image frame resolution and/or an appropriate frame rate, and the resolution may comprise resolution of the one or more cameras 102 mounted on the device 100. The image frame resolution may be defined by the number of pixels in a frame. The image resolution of the one or more cameras may comprise any of the following resolutions, without limitation: 32×24 pixels; 32×48 pixels; 48×64 pixels; 160×120 pixels; 249×250 pixels, 250×250 pixels, 320×240 pixels, 420×352 pixels, 480× 320 pixels, 640×480 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. The resolution of the cameras may comprise a resolution within a range defined by any two of the preceding pixel resolutions, for example within a range from 32×24 pixels to 250×250 pixels (e.g., 249×250 pixels). In some embodiments, the system comprises more than one imaging sensor (e.g. camera, etc.), such as at least 2, 3, 4, 5, 6, 7, 8, 9, or 10 imaging sensors. In some embodiments, plural imaging sensors can yield high accuracy even while using low resolution imaging sensors (e.g., an imaging resolution lower than the imaging resolution of the system with only one imaging sensor). In some embodiments, at least one dimension (the height and/or the width) of the image resolution of the imaging sensors can be no more than any of the following, including but not limited to 8 pixels, 16 pixels, 24 pixels, 32 pixels, 48 pixels, 72 pixels, 96 pixels, 108 pixels, 128 pixels, 256 pixels, 360 pixels, 480 pixels, 720 pixels, 1080 pixels, 1280 pixels, 1536 pixels, or 2048 pixels. In some embodiments, the system is configured to accurately identify at least 10, or at least 12, or at least 15, or at least 20 different hand poses per user, with an average accuracy of at least 85%, at least 88%, at least 90%, at least 91%, at least 92%, at least 93%, at least 94%, at least 95%, or higher.

The camera may have a pixel size smaller than 1 micron, 2 microns, 3 microns, 5 microns, 10 microns, 20 microns, and the like. The one or more cameras may have a footprint (e.g., a dimension in a plane parallel to a lens) on the order of 10 mm×10 mm, 8 mm×8 mm, 5 mm×5 mm, 4 mm×4 mm, 2 mm×2 mm, or 1 mm×1 mm, 0.8 mm×0.8 mm, or smaller, which allows the device to incorporate one or more cameras and locate the cameras very close to the skin of a user. The footprint of the cameras 102 may comprise a dimension defined by any two of the preceding dimensions, for example within a range from 2 mm to 8 mm, such as 3.5 mm.

The captured images from the cameras may comprise a series of image frames captured at a specific frame rate. In some embodiments, the sequence of images may be captured at standard video frame rates such as about 16p, 24p, 25p, 30p, 43p, 48p, 50p, 60p, 62p, 72p, 90p, 100p, 120p, 300p, 50i or 60i, or within a range defined by any two of the preceding values. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds, or 0.1 seconds, or 0.25 seconds, or 0.5 seconds. In some cases, the capture rate may change depending on user input and/or external conditions under the guidance of a control unit (e.g. illumination brightness).

In some embodiments, ambient light may be sufficient illumination for the device 100 to capture suitable images. In some embodiments, the device may optionally comprise a light source suitable for producing images having suitable brightness and focus. In some embodiments, the light source may include a light-emitting diode (LED), an optical fiber for illumination, a micro-LED, an IR light source, or otherwise.

The images captured by the cameras may be captured in real time, such that images are produced with reduced latency, that is, with negligible delay between the acquisition of data and the rendering of the image. Real time imaging allows the system to continuously evaluate hand and finger poses and gestures. Real time imaging may include producing images at rates of about or faster than 30 frames per second (fps) to mimic natural vision with continuity of motion.

Figure 2:
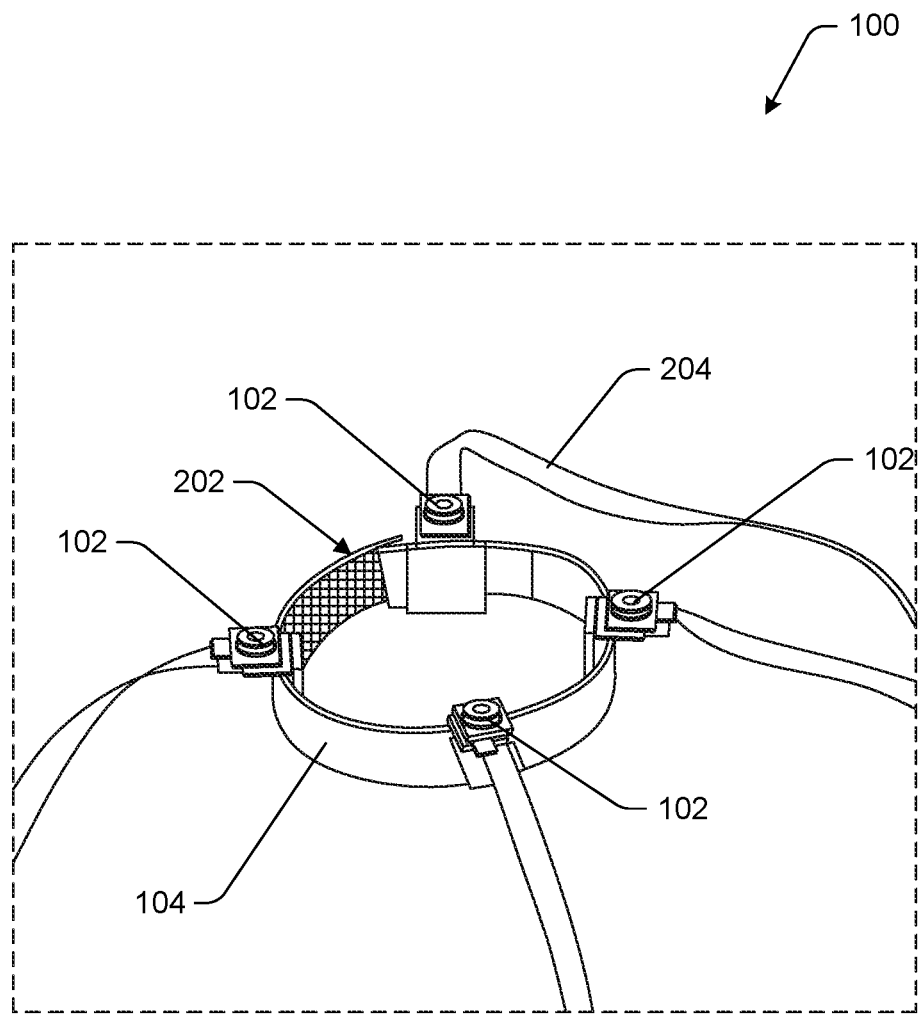
FIG. 2 illustrates an example human to computer interface including one or more cameras mounted on a band, in accordance with some embodiments.

With additional reference to FIG. 2, the device 100 is illustrated in an embodiment in which four cameras 102 are shown being space equally about a mount 104, which may be a wristband. In some cases, the mount 104 may be formed of a resilient material, or may have a portion formed of a resilient material, such as to allow the mount 104 to define a diameter that can be expanded, such as for moving the mount 104 over the hand of a user. The mount 104 may be formed of any suitable material, such as a natural material (e.g., leather, cotton, rubber, etc.), a synthetic material (e.g., plastic, synthetic textile, etc.), or a combination of materials.

In some cases, the mount 104 may have a clasp structure 202 to selectively connect a first end of the mount to a second end of the mount. The clasp structure may be any suitable structure and may include, for example, hook and loop fastener, a buckle, a snap, a tie, a magnet, or some other structure that can be selectively released to allow the mount 104 to be worn or removed by a user.

The one or more cameras 102 may be in communicative connection with a remote computing device. For example, in some cases, the cameras 102 may have a wired connection 204 that allows the cameras to transmit images to a computing device, such as for processing, analysis, storage, or some other purpose. In some cases, the cameras 102 have a wireless connection with a computing device and are configured to send images wirelessly.

Mounting sensors on a user's body removes the need for external sensors, allowing for the applications in mobile settings and improving the robustness of hand tracking. A common form factor for mounted sensor-based approaches is the use of gloves with integrated sensors. The gloves may incorporate various sensors to capture signals associated with the local motion of the palm and fingers of a user. The signals may be assembled into hand poses using various techniques. However, these types of gloves are not ideal for many reasons. For instance, sensor-laden gloves tend to be bulky, which can hinder dexterous and natural movements of the hand and can interfere with human-environment interactions.

In contrast, wrist-mounted sensors offer the unique opportunity for sensing hands in a ubiquitous and dexterity-enabling manner. Through experimentation by the current inventors, wrist-mounted devices have shown promise to record and reconstruct hand poses, gestures, and finger positions and recognize daily activities.

According to some embodiments, one or more cameras 102 may be mounted on a wrist band 104, which may be a form fitting band. One of the challenges with such a camera location is self-occlusion of the hand. For example, a camera may not have one or more fingers of the user within the field of view of the camera 102. In some cases, only one or more fingertips may be available in a field of view of a camera. As used herein, unless otherwise stated, the term fingertip includes a distal phalanx or phalange or any portion thereof (e.g., a dorsal surface, a ventral surface, a distal end, or the like, or a combination thereof) of a finger, which may be a thumb. For example, a single camera mounted on the back of the wrist may not have any fingers or fingertips within a field of view. Nevertheless, the system 100 may be configured to continuously infer the positions of the fingers based upon visual information that is available. In some instances, one or more fingertips may move into or out of the field of view. Similarly, the contours of the back of the hand that are within the field of view provide surface indications associated with the pose of the hand and finger positions. The changing views allow the system to accurately and continuously infer the hand poses and finger positions. In some cases, the field of view of a single camera captures data associated with the back of a user's hand, such as the area of skin between the wrist and the knuckles. In other words, in some cases, a camera capturing images of the back of a user's hand may not have any fingers within its field of view. The system may still be able to determine hand poses and finger positions with a high degree of accuracy. In some embodiments, the system is able to determine hand poses and finger positions with high degree of accuracy from captured images, wherein those captured images comprising limited visual information such that the human eyes are not able to determine hand poses and finger positions from those captured images, or the human eyes can determine hand poses and finger positions with a very low accuracy, such as less than 30%, less than 20%, less than 10%, less than 5%, or less than 1% accuracy for a pose or for multiple poses on average. In some embodiments, the limited visual information from an image or a combination of the captured images for a pose or a finger position comprises information for no more than 4 fingers, no more than 3 fingers, no more than 2 fingers, no more than 1 fingers, or no fingers observable or identifiable by human eyes.

According to some embodiments, a synthetic hand dataset is created and used to verify hand poses. A deep neural network may be trained to recognize discrete shapes and contours of the portions of the hand within a field of view of the camera, and hand poses can be inferred by regressing the pose parameters based on occluded imaging data captured by the one or more cameras. In embodiments utilizing more than one camera, the rendered images from each of the cameras may be used to represent images of the hand from various angles and fields of view and the system may regress the pose parameters that are used to make up the images of the hand. After training a deep neural network, according to some experiments, the model has been shown to achieve a mean absolute error percentage of less than 12%.

Figure 3:
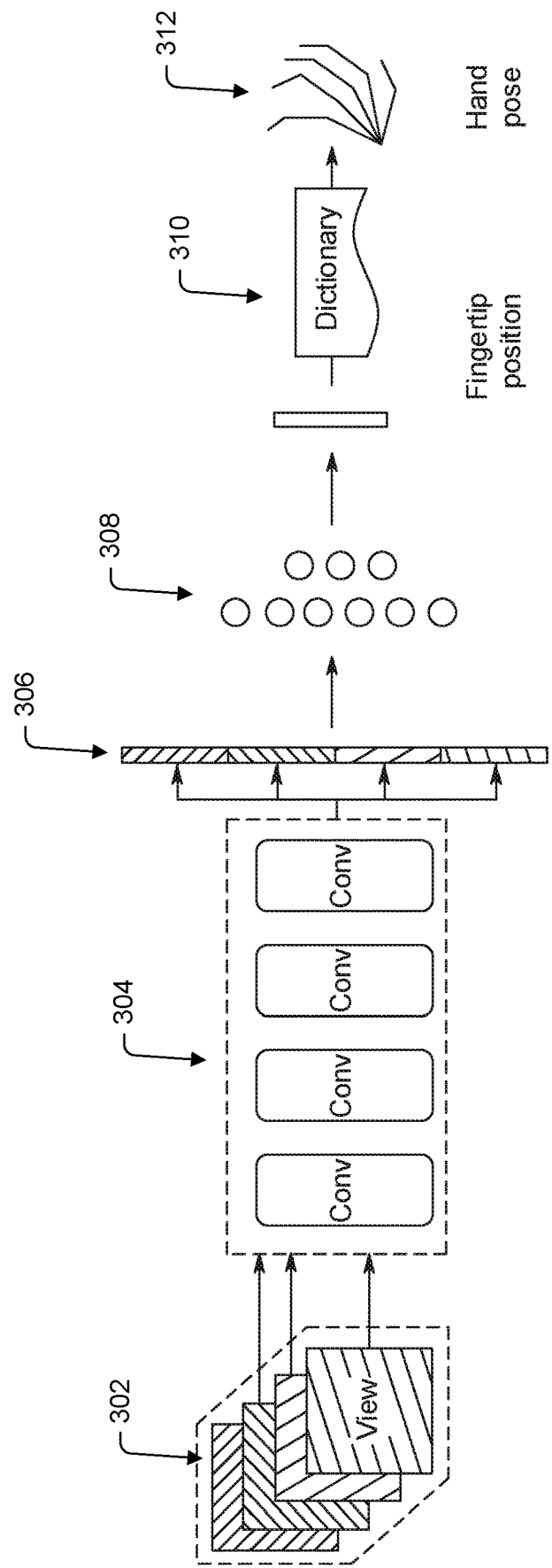
FIG. 3 illustrates a sample machine learning algorithm for estimating a hand pose, in accordance with some embodiments.

FIG. 3 illustrates an example framework used to infer a hand pose. While the example of FIG. 3 utilizes four cameras mounted to a wrist of a user, it should be appreciated that any suitable number of cameras may be used with a high degree of accuracy, such as one, two, three, four, six, eight, ten or more cameras positioned on a wrist of a user. At a high level, the system employs a convolutional neural network 304 to regress one or more fingertip positions in three dimensions.

More specifically, in some examples, the framework includes a deep model for fingertip prediction, and a kinematic model for full hand joint estimation. According to some embodiments, the framework will receive the image input 302 of the one or more cameras. In embodiments that include multiple cameras, the framework will receive images from the cameras that are captured at the same time. The images may include time stamp data to allow the system to accurately associate the images captured at the same time. The images may be sent to a deep convolutional network 304 that has been trained to predict the fingertip positions in three dimensions. The full set of hand joint angles may also be inferred by feeding the predicted fingertip positions into a kinematic model.

For each time step, the model may be configured to output an estimation of full hand joint positioning, which may enable continuous hand tracking. In some embodiments, images that are captured at the same time by multiple cameras may be stitched to create a three-dimensional hand model which can be used to predict a 15-dimension output (e.g., 3D coordinates of the five fingertips). In some cases, a 20-dimension output is created.

In some cases, the model includes a backbone network 304 and a regression network 308. According to some implementations, each of the image frames 302 is sent to the backbone network 304 where the image features are extracted independently. The features may further be concatenated at a batch normalizer 306 which may also rescale and/or involve channel reduction.

In some cases, each block within the convolutional neural network 304 includes several convolution operations. In some cases, each convolution operation is followed by a batch normalization 306 and rectified linear unit. A global average pooling may be performed at the end of the backbone network 304 to extract a vector representation of each image. The backbone network 304 may be pre-trained to recognize patterns within imagery for visual recognition.

The regression network 308 may include one, two, or more fully connected layers. In some embodiments, the regression network 308 maps the concatenated features into a 15-dimension output.

In some cases, the output of the regression network 308 may be compared with a known dictionary 310 to verify the three-dimensional hand pose 312.

In some cases, the framework is trained by using labels and ground truth hand pose information. In some cases, a separate model may be trained for each unique user to account for unique hand and finger sizes, poses, and gestures. In some cases, training involves mini-batch stochastic gradient descent and may further include momentum and descent. One of the difficulties in training models results from changing conditions during visual imaging. One way of training the model to deal with visual changes is by applying random color perturbation such as to mimic camera color distortion and light conditions changing during image capture. This type of color- specific training allows the trained model to be more robust and less susceptible to induced errors from environmental factors.

In some example embodiments, once the fingertip positions are determined, the rest of the joint angles may be inferred through inverse kinematics. For example, forward kinematics may be used to map from joint angles to fingertip positions to create a kinematic dictionary 310. In some cases, the inferred joint angles can be re-casted into a reverse lookup query in the dictionary 310. Once the dictionary 310 is populated, the retrieval of the hand position is efficient as the results satisfy biomechanical constraints of the hand.

Figure 4A:
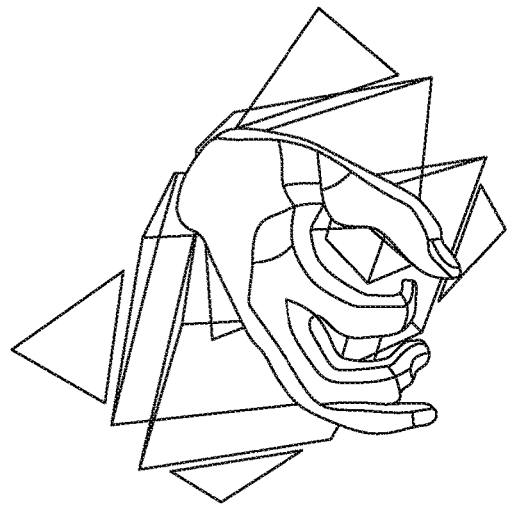
Figure 4A:
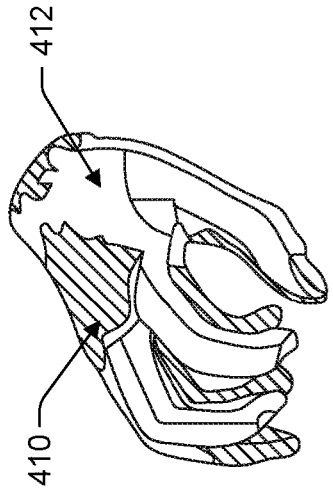
Figure 4A:
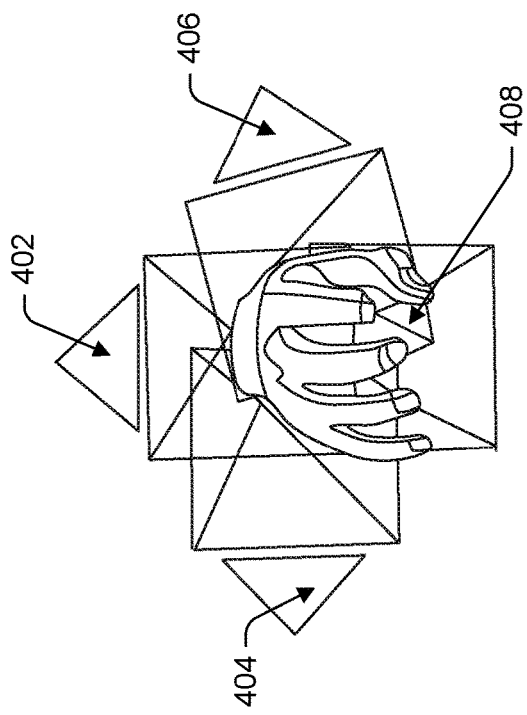

FIGS. 4A, 4B, 4C, and 4D illustrate sample image and results on a synthetic data set. For example, FIGS. 4A and 4B illustrate a front view and an isometric left view, respectively, showing the fields of view from an embodiment device utilizing four cameras spaced equally about the wrist of a user. In some cases, the device includes a top camera 402 that is located on the back of the wrist of a user and is aimed at the back of the hand of the user. In some embodiments, additional cameras may be used, such as a right camera 404, a left camera 406, and/or a bottom camera 408. In some cases, only a single camera is used, which may be positioned as a top camera 402, a right camera 404, a left camera 406, or a bottom camera 408, or some other orientation about the wrist of a user. The fields of view of the cameras are shown as squares with each camera capturing a unique view. In some embodiments, the fields of view of two or more cameras may overlap, while in other cases, the fields of view may not overlap.

Figure 4C:
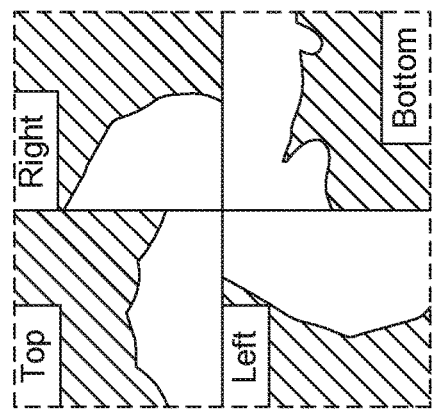

FIG. 4C is a representation of images captured by each of the four cameras. As can be seen, the images do not capture much information related to fingertips or finger positions. In fact, as illustrated, three of the images do not capture the fingers or fingertips at all. Nevertheless, fingertip prediction and hand pose inference can be very accurate based upon the information that is captured. Furthermore, a first capture from a first camera can be compared with a second capture from the first camera and based upon the biomechanical limitations of the hand joints, comparing a first capture with a second capture can provide valuable clues that increase the accuracy of a prediction. In some embodiments, the system captures one or more images by one or more imaging sensors, wherein the one or more images, or the combination of one or more images for a hand pose capture limited information related to hand joints, fingertips, and/or finger positions. In some embodiments, the limited information is for at most 10%, at most 15%, at most 20%, at most 25%, at most 30%, at most 40%, at most 50%, at most 60%, at most 70% or at most 80% of the hand joints and/or finger tips.

By utilizing the model, such as that described above with respect to embodiments herein, the system can infer hand poses. FIG. 4D illustrates a comparison between the ground truth 410 which is shown in cross hatching, and a predicted hand pose 412 shown without cross hatching. By iteratively training the model on ground truth and populating a dictionary, the inferred hand pose can be quite accurate, and testing has shown an accuracy of over 98% in many cases. In some embodiments, a 3D spatial position of the hand pose is constructed by predicting positions of at least a portion of the hand joints or at least a portion of the positions of finger tips including the hand joints and/or finger tips not captured by the images from the imaging sensor(s). In some embodiments, one or more images are captured by one or more imaging sensors and processed by a processor or microprocessor to predict a 3D spatial position for a hand pose of the user, and wherein the one or more images or their combinations capture limited visual information for less than 30%, less than 40%, less than 50%, less than 60%, or less than 70% of the hand joints and/or finger tips of a hand for the hand pose, and the predicted 3D spatial position comprises full information for the hand pose, or at least 80%, 90%, 95% or 100% information or accurate information for the hand joints and/or finger tips of the hand for the hand pose. The accuracy of the prediction for a hand pose is at least 88%, at least 90%, at least 92%, at least 95%, at least 96%, or at least 98%. In some embodiments, the prediction is based on a model comprising parameters of joints (e.g. length between joints, joint angles, 3D coordinates of joints, and/or any combination thereof), parameters of finger tips (e.g. 3D coordinates of finger tips), parameters of specific hand poses (e.g. generated by one or more learning models) and/or any combination thereof.

Figure 5A:
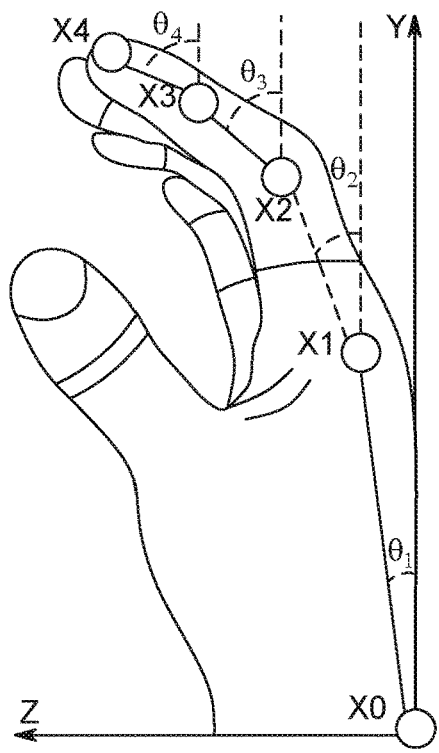
FIGS. 5A and 5B illustrate a kinematic model of a hand and the degrees of freedom of a finger joint, in accordance with some embodiments.
Figure 5B:
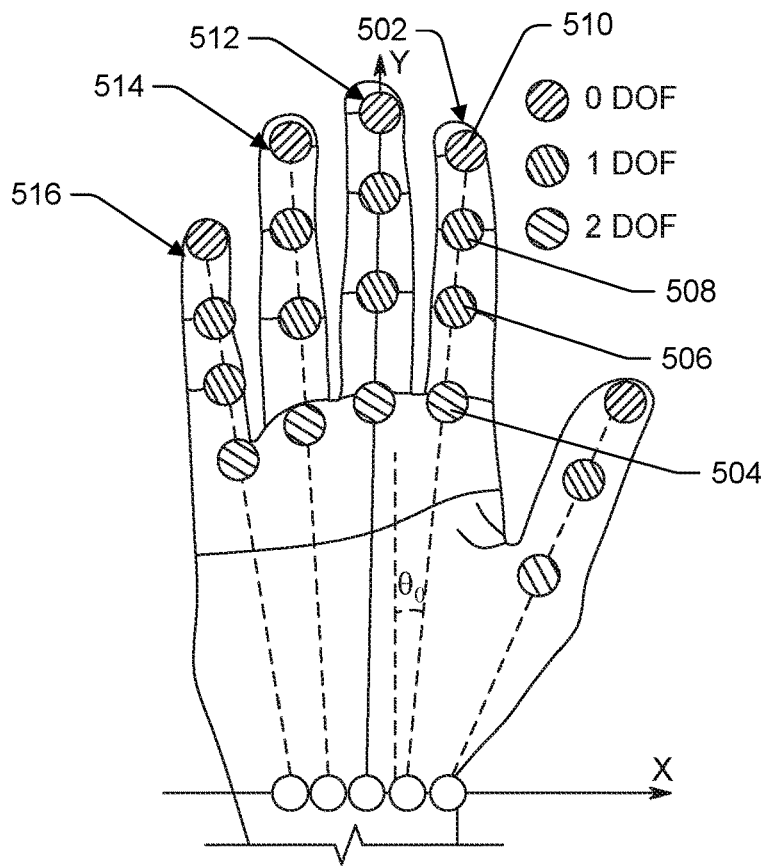

FIGS. 5A and 5B illustrate a kinematic model that may be used to infer the hand joint positions. A kinematic model that relies on images taken from the wrist is different than a model that relies on remotely mounted cameras. For example, a wrist-based system has fewer degrees of freedom, because the wrist is the origin and therefore removes the degrees of freedom ordinarily provided by the wrist joint. Accordingly, a simplified kinematic model may be employed for a wrist-mounted system that locates an origin at the wrist. In some cases, each of the four fingers (excluding the thumb) is parameterized by four joints and one fingertip. Three of the joints are located at the finger joints and one of them is at the wrist.

The joints and the degrees of freedom associated with them is illustrated in FIG. 5B. For example, the first digit 502 includes three joints, the metacarpophalangeal joint (MCP) 504, the proximal interphalangeal joint (PIP) 506, and the distal interphalangeal joint (DIP) 508. The MCP 504 has two degrees of freedom, being able to pivot about the joint toward the palm (i.e., flexion and extension), and moving the fingers towards or away from one another (i.e., adduction and abduction). The PIP 506 and DIP 508 each have a single degree of freedom, only able to pivot about the joint. The fingertips 510, are not capable of moving independently of the finger joints, and therefore have zero degrees of freedom.

The three-dimensional coordinates of the joints as $X_i=(x_k, y_k, z_k)$ with $i \in [0,4]$. The joint nodes from the wrist to the fingertip are indexed from $X_0$ to $X_4$. The indexing of X is fully parameterized in the model by joint angles $[\theta_0, \theta_1, \theta_2, \theta_3, \theta_4]$, where $\theta_0$ is the deflection angle when a finger is moving and $\theta i$ ($i>0$) are the bending angles of each joint (i.e., Euler angles). Once the device is mounted, $\theta_0$ becomes fixed. The relation between $\{\theta_i\}$ and $\{X_i\}$ ($i>0$) are given by the forward kinematics as $x_i = x_{i-1} - (l_{i-1} \cdot \cos(\theta_i)) \cdot \sin(\theta_{i-1})$
$y_i = y_{i-1} + (l_{i-1} \cdot \cos(\theta_i)) \cdot \cos(\theta_{i-1})$
$z_i = z_{i-1} + (l_{i-1} \cdot \sin(\theta_i))$ Where $l_{i-1}$ is the finger length between the joint i−1 and i. We may assume the finger joint length $\{l_i\}$ is fixed as it does not have a large effect on hand poses. For the thumb finger, only three joints ($i \leq 3$) are available and the equations remain the same.

Because of limited and known phalanx biomechanical kinematics, the joints positions in the hand model may be constrained once the fingertip positions are known. The kinematic dictionary may capture the constraints which facilitates the inference of the joint positions. In some cases, the dictionary may be populated by enumerating the parameter space of $[\theta_0, \theta_1, \theta_2, \theta_3, \theta_4]$ for each finger with a small step size, and recording the corresponding finger positions $X_4$. The range of parameters are listed in Table 1, shown below.

TABLE 1

Range of the joint angels for creating the kinematic dictionary.

| Finger | $\theta_0$ | $\theta_1$ | $\theta_2$ | $\theta_3$ | $\theta_4$ |
|---|---|---|---|---|---|
| Thumb | [−90°, 0) | 0 | [−90°, 90°) | [$\theta_2$, $\theta_2$ + 90°) | [$\theta_3$, $\theta_3$ + 90°) |
| Index | [−30°, 0) | [−90°, 90°) | [$\theta_1$, $\theta_1$ + 90°) | [$\theta_2$, $\theta_2$ + 60°) | [$\theta_3$, $\theta_3$ + 45°) |
| Middle | 0 | [−90°, 90°) | [$\theta_1$, $\theta_1$ + 90°) | [$\theta_2$, $\theta_2$ + 60°) | [$\theta_3$, $\theta_3$ + 45°) |
| Ring | [0, 30°) | [−90°, 90°) | [$\theta_1$, $\theta_1$ + 90°) | [$\theta_2$, $\theta_2$ + 60°) | [$\theta_3$, $\theta_3$ + 45°) |
| Little | [0, 45°) | [−90°, 90°) | [$\theta_1$, $\theta_1$ + 90°) | [$\theta_2$, $\theta_2$ + 60°) | [$\theta_3$, $\theta_3$ + 45°) |

In some embodiments, once the fingertip positions are determined in combination with a prepopulated kinematic dictionary, the joint parameters can then be retrieved and determined from the dictionary. For instance, $\theta^*_0$ can be determined by using the equation:

$$\theta^*_0 = \arctan\left(\frac{x_4 - x_0}{y_4 - y_0}\right)$$

This is possible because, according to the kinematic model, there may only be a single solution of $\theta_0$ for a given fingertip position. Given $\theta_0$, we further search all values of $[\theta_0, \theta_1, \theta_2, \theta_3, \theta_4]$ to identify a set of parameters $[\theta^*_0, \theta^*_1, \theta^*_2, \theta^*_3, \theta^*_4]$ that is closest to the given fingertip position. This can be done very efficiently using, for example, a locality sensitive hashing. The result $[\theta^*_0, \theta^*_1, \theta^*_2, \theta^*_3, \theta^*_4]$ must satisfy kinematic constraints and may be used as the output estimation.

Similarly, fingertip positions can be determined for a second digit 512, a third digit, 514, and a fourth digit 516. From determined fingertip positions in three-dimensional space, the joint parameters for each of the fingers can be determined and combined into a 3D model to estimate hand pose.

To further enhance the output estimation, the model may determine fine-grained micro-finger poses. In some cases, the system may learn another deep model to classify these fine-grained micro-finger poses. Optionally, the trained weights from the pose estimation network may be leveraged to efficiently generate pose recognition. This may be done, for example, by utilizing a similar network architecture as described with respect to embodiments herein, although a last layer may be replaced by a fully connected layer, which may be supervised by cross entropy loss for classification. In some cases, the penultimate layer may be dropped, and optionally, the first three blocks of the backbone may be frozen such as to prevent over-fitting.

Figure 6:
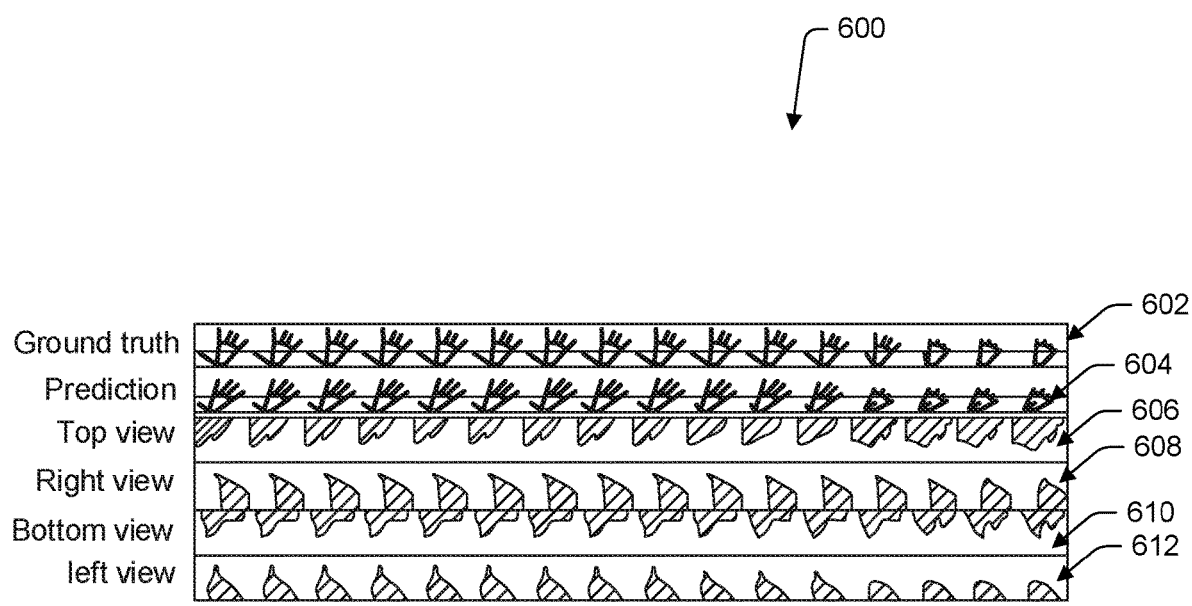
FIG. 6 illustrates continuous hand pose estimation results based on wrist-mounted image capture; in accordance with some embodiments.

FIG. 6 illustrates continuous hand pose estimation results 600 using embodiments as described herein. In some examples, the inventors have discovered that continuously reconstructing hand postures is possible without the need of seeing all the fingers. Moreover, the hand poses can be determined with only outline imaging data. For example, in some cases, one or more thermal imaging cameras were used to capture outline images (e.g., silhouettes) from a wrist-mounted system, and the system was able to accurately estimate the hand position. In some cases, the hand position was estimated from low resolution imagery, such as on the order of 32×24 pixels.

The hand pose estimation results 600 are shown in columns that represent each time step of imaging. The first row represents ground truth 602, such as the actual hand pose as observed by a human. The second row represents a predicted hand pose 604 based upon embodiments such as those described herein with reference to FIGS. 1-5. The third row 606 represents a view from a top wrist-mounted camera. The fourth row 608 represents a view from a right-side wrist-mounted camera. The penultimate row 610 represents a view from a bottom-side wrist-mounted camera. The last row 612 represents a view from a left-side wrist-mounted camera. In some examples, the views of the top, right, bottom, and left view are captured by thermal imaging cameras, while in other embodiments, the views represent images captured by CCDs or CMOS sensors. In some cases, the images are low resolution, such as less than about 64×64 pixels, and in some cases, represent silhouette images.

In some embodiments, a single camera is used to capture a single field of view. Through training a model, images capturing a single field of view can be used to infer and predict hand poses and gestures with a relatively high degree of accuracy. In some cases, a single camera mounted to the back of the wrist can be used to predict hand pose and gesture data with a degree of accuracy above 80%, or above 85%, or above 90%, or in some cases above 95%.

In some embodiments, a system is configured to capture images of a hand from a wrist-mounted system comprising one or more cameras. In some cases, the wrist-mounted system captures images of less than all of the fingers. In some cases, the wrist-mounted system captures image data associated with one finger, or two fingers, or three fingers, or four fingers. From the images containing less than all of the fingers, the system is able to determine a hand pose, including all of the fingers. In some embodiments, a large percentage of the captured images contain surface curvature of the hand of a user, and in some cases, captures predominantly the back of the hand of a user. For example, in some cases, greater than 90% of the captured hand image data is of the back of the hand, and less than 10% of the captured image data includes one or more fingers of a user. In other cases, greater than 80% of the captured hand image data is of the back of the hand, and less than 20% of the captured hand image data includes one or more fingers of a user. As an example, where an image captures data associated with a hand, the image data associated representing the hand (e.g., excluding background image data) is the captured hand image data. In some cases, greater than 70% of the captured hand image data includes the back of the hand, while less than 30% of the captured hand image data includes image data associated with one or more fingers of a user. The result is that a system that largely captures image data associated with the back of the hand of a user provides valuable information for inferring hand pose and gesture, even where the captured hand image data largely lacks data associated with the fingers of a user.

Figure 7A:
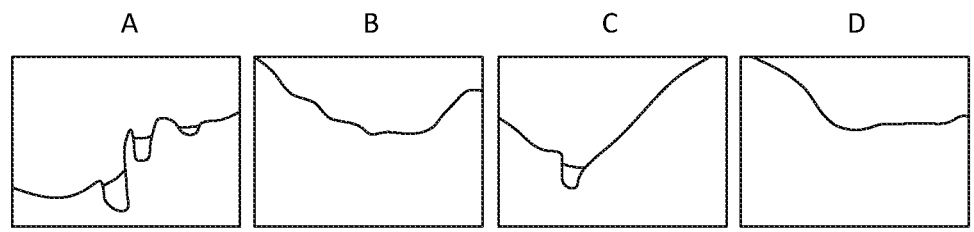
FIG. 7A illustrates sample images captured from a wrist-mounted imaging sensor, in accordance with some embodiments.
Figure 7B:
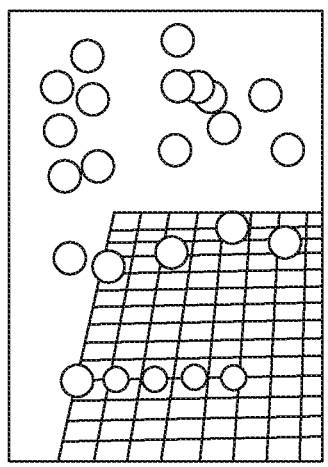
FIG. 7B illustrates a sample predicted hand pose based on the images of FIG. 7A, in accordance with some embodiments.

FIGS. 7A and 7B illustrate sample images captured from a wrist-mounted imaging sensor and a predicted hand pose based on the images, respectively. In block A, a first image is captured by a first camera showing a first field of view. In block B, a second image is captured by a second camera showing a second field of view. In block C, a third image is captured by a third camera showing a third field of view. In block D, a fourth image is captured by a fourth camera showing a fourth field of view. As illustrated, only block A and block C include any meaningful captured hand image data that includes visible fingers. Notably, even isolating block B that does not include any captured hand image data that includes fingers, the system can use this captured hand image data to infer hand poses and finger positions.

FIG. 7B illustrates a predicted hand pose based upon the image data of FIG. 7A. Notably, the discrete data points represent portions of fingers based upon a kinematic model and a determined position of the five fingertips in three-dimensional space.

One of the benefits of the embodiments described herein is the capability to reconstruct the entire range of hand poses (e.g., 20 finger joint positions) by deep learning the outline shape of the hand by one or more cameras located close to the wrist of a user. As used herein, close to the wrist refers to a distance between the skin of a user and the optical axis of the camera. In some cases, the distance is within the range of from 2 mm to about 10 mm, or from 3 mm to about 5 mm. In some cases, the distance is about 2 mm, 3 mm, 4 mm, 5 mm, 6 mm, 7 mm, or 8 mm.

In some embodiments, one or more cameras capture less than all of the fingers at a framerate of about 16 Hz, or about 20 Hz, or about 22 Hz, or about 28 Hz, or about 30 Hz.

Figure 8:
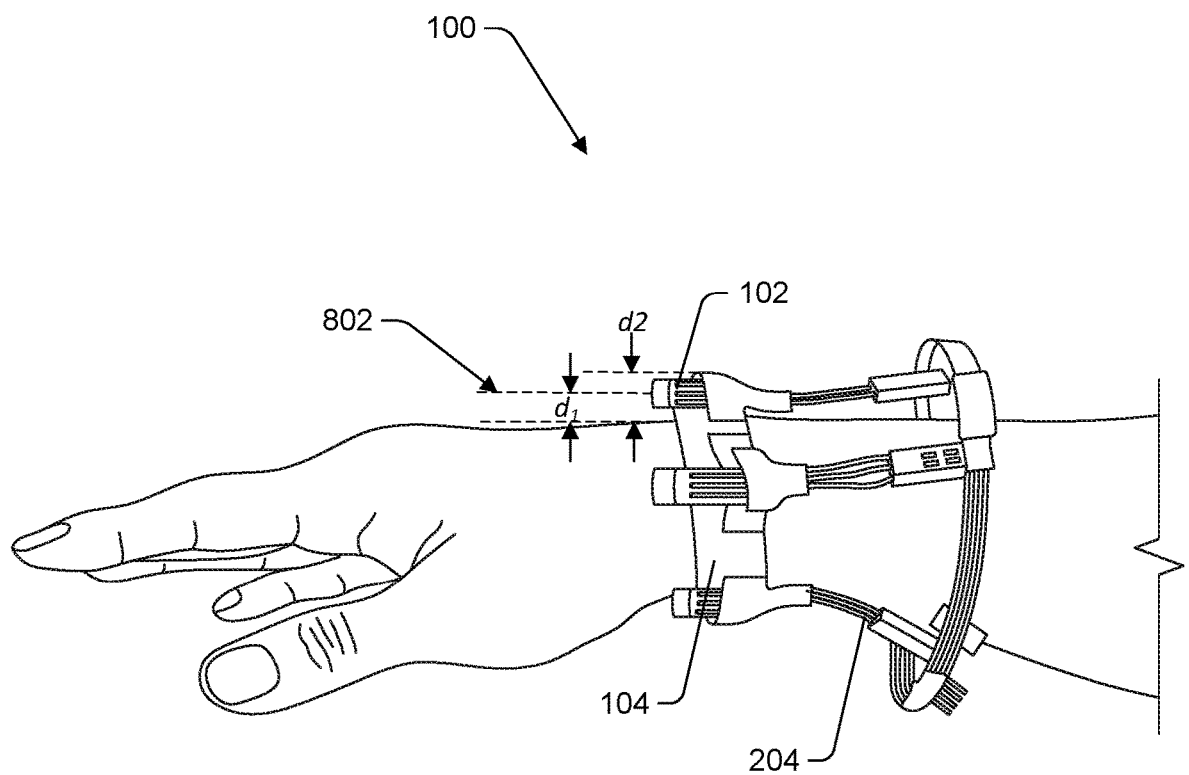
FIG. 8 illustrates an example embodiment of a wrist-mounted system for continuously estimating a hand pose of a user, in accordance with some embodiments.

FIG. 8 illustrates an example embodiment of a low-profile wrist-mounted system 100 for continuously estimating a hand pose of a user. The system 100 may use one or more cameras 102 secured to a mount 104. The system 100 may be considered low-profile, meaning that the dimensions of the system locate the cameras 102 in close proximity to the wrist of a user. The cameras may have an optical axis 802 that defines the center of the lens along the center of a focal direction of the camera. The optical axis 802 may be spaced a distance $d_1$ away from the wrist of a user. The distance $d_1$ may be on the order of less than 3 mm, or less than 4 mm, or less than 5 mm, or less than 6 mm, or less than 7 mm.

Similarly, the outer periphery of the system 100, (e.g., the location on the system that is furthest away from the wrist of the user), may be spaced a distance $d_2$ from the wrist of the user. The distance $d_2$ may be on the order of about less than 5 mm, or less than 8 mm, or less than 10 mm, or less than 12 mm, or less than 18 mm, or less than 20 mm.

In some cases, the optical axis 802 may be spaced a distance away from the mount (e.g., wearable band) a distance less than about 1 mm, or less than about 2 mm, or less than 4 mm, or less than 5 mm, or less than 7 mm. A low-profile mount thus allows the optical axis to be spaced a distance away from the skin of the user which allows the system to be nonobtrusive, which is a significant advantage over prior system. However, such a low-profile system creates additional considerations resulting from the available field of view from this perspective that is very close to the skin of a user. The resulting field of view will be largely occluded by the hand of the user and it may be more difficult to acquire hand image data that includes finger image data.

The system 100 may be combined with other sensors to provide additional details regarding hand poses or gestures. As an example, one or more inertial measurement units (IMU) may be combined with the systems described herein to provide motion data of a hand or arm in combination with a hand pose or gesture. Similarly, a first system 100 may be worn on a first wrist of a user and a second system 100 may be worn on a second wrist of the user. The first and second systems may each independently infer hand poses and gestures of the respective hands to which the systems are imaging. However, the poses and/or gestures of each of the two hands may be combined together to recognize two-handed discrete poses and gestures.

While the system 100 illustrated in FIG. 8 shows 4 cameras, it should be appreciated that a single camera 102 can be used to provide meaningful data to infer hand pose and gestures. Through experimentation, the mean average error (MAE) can be reduced by adding additional cameras beyond a single camera; however, very acceptable results can be achieved using a single camera. A single camera may be mounted on the inside of the wrist (e.g., imaging the palm side of the hand), or on the back of the wrist imaging the back of the hand. Additional cameras can be added to reduce the MAE; however, there is a point of diminishing returns that was exhibited beyond about 4 cameras. That said, increased accuracy can be found by utilizing 5, 6, 7, or 8 cameras in a wrist-mounted camera system.

Through experimentation and learning the model, it has been shown that a low profile camera that captures images in which the fingers and fingertips are largely occluded by the hand of the user continues to provide valuable data for accurate hand pose and gesture recognition.

According to examples, a single camera capturing deformation of the skin located on the back of the hand provides sufficient data for acceptable accuracy. In some experiments, a single camera capturing skin deformation (e.g., captured hand image data where fingers were largely occluded), provided sufficient information to provide hand pose tracking with an accuracy of greater than 75%, or greater than 78%, or greater than 80%.

In some examples, one or more thermal imaging cameras 102 were secured to a mount 104. In some examples, the thermal imaging cameras 102 had a temperature sensitivity of about ±1° C. The thermal imaging cameras 102 had a framerate of 16 Hz, a resolution of 32×24 pixels, and a field of view of 110°. Each camera was in communication with a remote computing device for receiving and processing the image data. A time matching algorithm may be used to synchronize the image capture in a device using more than one camera to encourage all the image frames for a given time step to be captured at the same time.

In some cases, the device may be calibrated for each unique user. For example, a user may be asked to perform predefined gestures to calibrate the device each time the user wears the device. In some cases, the system may instruct a user on how to adjust the device for a subsequent use to ensure that the field of view will be comparable to a calibration field of view to increase accuracy of predictions and inferences.

According to some embodiments, the device 100 may include a power supply, which may be any suitable power supply, such as, for example, a battery, a solar cell, a kinetic energy harvester, a combination of power supplies or other power supply which may provide power for the cameras 102, and in some cases, one or more processors.

In some embodiments, the device may be in communication with a remote computing device that is configured to receive, analyze, and/or process the image data such as to apply the deep neural network to estimate hand pose and gestures. The communication may be wireless, wired, or a combination. As with any embodiment, the one or more cameras may be depth sensing, infrared, RGB, thermal spectrum, hyper spectrum, or some other camera type or combination of camera types.

Figure 9:
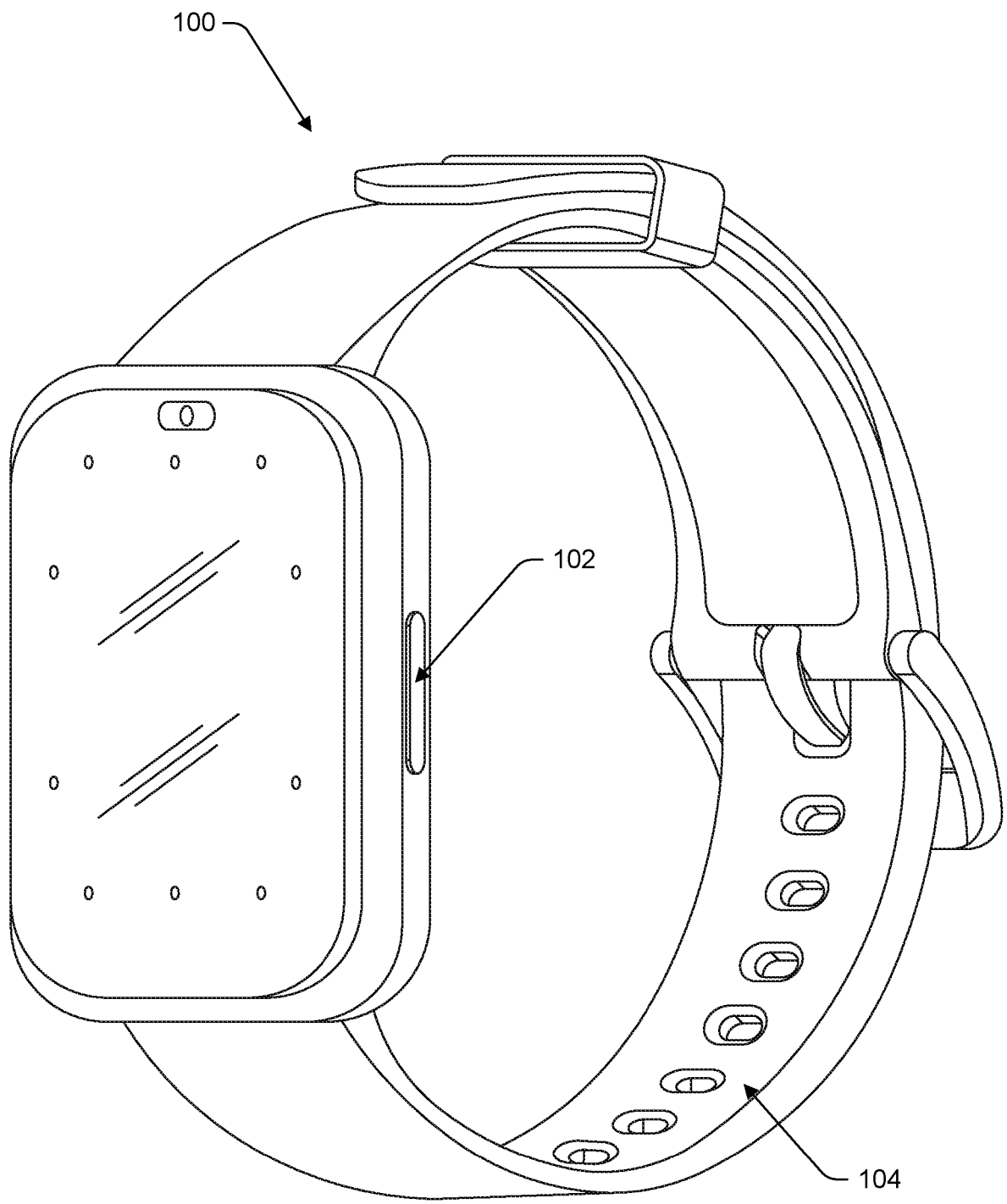
FIG. 9 illustrates an example embodiment of a wrist-mounted system for continuously estimating a hand pose of a user, in accordance with some embodiments.

FIG. 9 illustrates another form factor of an embodiment of a low-profile wrist-mounted system 100 for continuously estimating a hand pose of a user. The system 100 may resemble a wristwatch and include a camera 102 and a mount 104. The camera 102 may be incorporated into the watch and be located to capture images of the users hand when the watch is worn. In some embodiments, the system includes two cameras positioned on opposite sides of the watch such that at least one camera will be facing the user's hand whether the system 100 is worn on the left hand or the right hand. The system may be as described herein with respect to any embodiment. In some cases, additional cameras may be secured to the mount and positioned to capture images of the user's hand when the device is worn on the wrist.

The system 100 may include a power supply, such as a battery, and may further include one or more processors. In some cases, the system 100 includes a communications system for sending/receiving data to/from a remote computing device.

Figure 10:
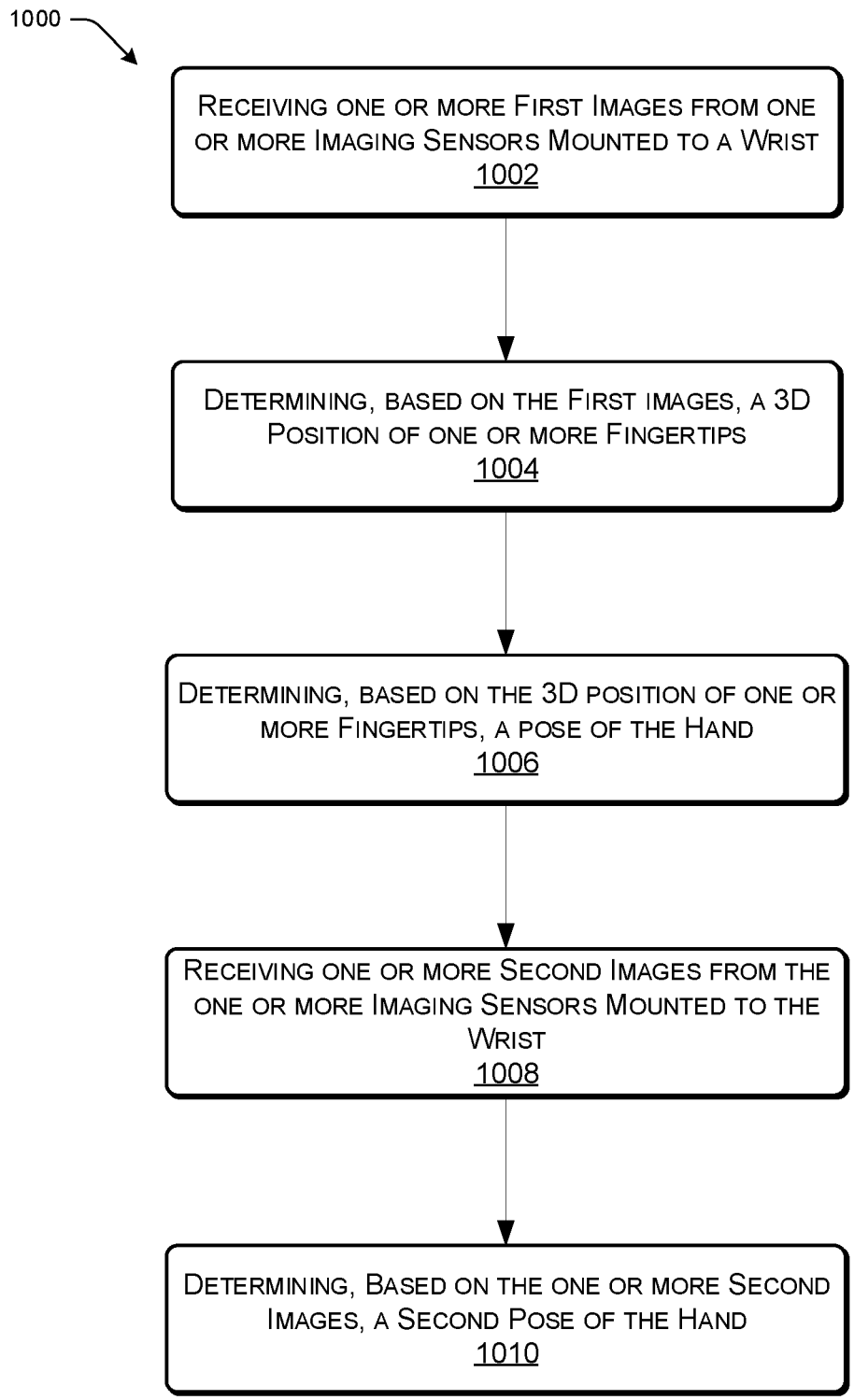
FIG. 10 illustrates a process diagram for determining a hand pose, in accordance with some embodiments.

FIG. 10 illustrates a method 1000 for determining hand poses and gestures. At block 1002, the system receives one or more first images from one or more imaging sensors mounted to a wrist. The images may include limited finger position data, but rather, include surface contours of the back of the wrist or hand.

At block 1004, the system determines, based at least in part on the one or more first images, a 3D position of one or more fingertips. This may be performed, for example, by the deep neural network, as described herein.

At block 1006, the system determines, based at least on the 3D position of the one or more fingertips, a pose of the hand.

At block 1008, the system receives one or more second images from the one or more imaging sensors.

At block 1010, the system determines, based at least in part on the one or more second images, a second pose of the hand. The second pose of the hand may be compared to the first pose of the hand and the system may recognize a gesture associated with the change from the first pose to the second pose.

In the described implementations, the system 100 may include the processor(s) and memory. In various embodiments, the processor(s) may execute one or more modules and/or processes to cause the imaging sensors (e.g., cameras) to perform a variety of functions, as set forth above and explained in further detail in the disclosure. In some embodiments, the processor(s) may include a central processing unit (CPU), a graphics processing unit (GPU), both CPU and GPU, or other processing units or components known in the art. Additionally, each of the processor(s) may possess its own local memory, which also may store program modules, program data, and/or one or more operating systems. The processor may include multiple processors and/or a single processor having multiple cores. The computing device may comprise distributed computing resources and may have one or more functions shared by various computing devices. In some instances, the imaging sensors are in communication with one or more computing devices through wired or wireless communication. The imaging sensors may be powered by a battery pack, which may be carried by the user, such as by the wearable band, or may be wired to receive power from another location or device.

The computing device may have memory which may include computer-readable storage media ("CRSM"), which may be any available physical media accessible by the processor(s) to execute instructions stored on the memory. In some implementations, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor(s). The memory may include an operating system, one or more modules, such as a video capture module, a video stitching module, a deep neural network module, a kinematic module, a sensor data module, and a sensor data analysis module, among others.

The imaging sensors may include one or more wireless interfaces coupled to one or more antennas to facilitate a wireless connection to a network. The wireless interface may implement one or more of various wireless technologies, such as Wi-Fi, Bluetooth, radio frequency (RF), and so on. In some instances, the imaging sensors are coupled to a wired connection to one or more computing devices to facilitate a wired connection for transmitting imaging data to the computing devices.

The processes described herein are illustrated as a collection of steps in a logical flow, which represent a sequence of operations that can be implemented in hardware, software, or a combination thereof. In the context of software, the steps represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described blocks can be combined in any order and/or in parallel to implement the processes. Moreover, some of the operations can be repeated during the process.

The imaging sensors may be any suitable image sensor, such as visible spectrum camera, thermal spectrum camera, infrared spectrum camera, or a combination. In some embodiments, the hand and/or finger pose may be used to control a virtual reality system by determining gestures, hand poses, hand movements, and the like. In some embodiments, the system is able to identify at least 10, or at least 12, or at least 15, or at least 20 different hand poses. In some cases, the system determines hand poses with an accuracy of at least 85%, at least 88%, at least 90%, at least 92%, at least 93%, at least 95%, or higher. As used herein, the term "hand pose" is a broad term and is used to indicate any position, orientation, flexure, or configuration of a hand and fingers, including roll, pitch, and yaw axes of the hand as well as finger abduction, adduction, flexion, extension, and opposition.

The disclosure sets forth example embodiments and, as such, is not intended to limit the scope of embodiments of the disclosure and the appended claims in any way. Embodiments have been described above with the aid of functional building blocks illustrating the implementation of specified components, functions, and relationships thereof. The boundaries of these functional building blocks have been arbitrarily defined herein for the convenience of the description. Alternate boundaries can be defined to the extent that the specified functions and relationships thereof are appropriately performed.

The foregoing description of specific embodiments will so fully reveal the general nature of embodiments of the disclosure that others can, by applying knowledge of those of ordinary skill in the art, readily modify and/or adapt for various applications such specific embodiments, without undue experimentation, without departing from the general concept of embodiments of the disclosure. Therefore, such adaptation and modifications are intended to be within the meaning and range of equivalents of the disclosed embodiments, based on the teaching and guidance presented herein. The phraseology or terminology herein is for the purpose of description and not of limitation, such that the terminology or phraseology of the specification is to be interpreted by persons of ordinary skill in the relevant art in light of the teachings and guidance presented herein.

The breadth and scope of embodiments of the disclosure should not be limited by any of the above-described example embodiments but should be defined only in accordance with the following claims and their equivalents.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

It is, of course, not possible to describe every conceivable combination of elements and/or methods for purposes of describing the various features of the disclosure, but those of ordinary skill in the art recognize that many further combinations and permutations of the disclosed features are possible. Accordingly, various modifications may be made to the disclosure without departing from the scope or spirit thereof. Further, other embodiments of the disclosure may be apparent from consideration of the specification and annexed drawings, and practice of disclosed embodiments as presented herein. Examples put forward in the specification and annexed drawings should be considered, in all respects, as illustrative and not restrictive. Although specific terms are employed herein, they are used in a generic and descriptive sense only, and not used for purposes of limitation.

Unless otherwise noted, the terms "connected to" and "coupled to" (and their derivatives), as used in the specification, are to be construed as permitting both direct and indirect (i.e., via other elements or components) connection. In addition, the terms "a" or "an," as used in the specification, are to be construed as meaning "at least one of." Finally, for ease of use, the terms "including" and "having" (and their derivatives), as used in the specification, are interchangeable with and have the same meaning as the word "comprising."

From the foregoing, and the accompanying drawings, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a particular configuration, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

Example 1 is a system including a wearable band comprising one or more pieces extending longitudinally along a first axis and operable to be coupled to an arm of a user, one or more imaging sensors, the one or more imaging sensors comprising at least a first imaging sensor disposed at a first position on the wearable band, the first imaging sensor disposed to have a first field of view that is lateral to the first axis and is anatomically distal when the wearable band is coupled to an arm of the user. The first imaging sensor defines an optical axis spaced a distance from the wearable band, the distance being less than about 10 mm.

Example 2 includes the subject matter of Example 1, wherein the one or more imaging sensors further comprise a second imaging sensor disposed on the wearable band at a second position, the second imaging sensor disposed to have a second field of view that is lateral to the first axis and is anatomically distal when the wearable band is coupled to an arm of the user, wherein the second field of view is different from the first field of view.

Example 3 includes the subject matter of Example 1 or Example 2, the one or more imaging sensors further comprising a third imaging sensor disposed on the wearable band at a third position, the third imaging sensor disposed to have a third field of view that is lateral to the first axis and is anatomically distal when the wearable band is coupled to an arm of the user, wherein the third field of view is different from the first field of view and the second field of view.

Example 4 includes the subject matter of any of Examples 1-3, the one or more imaging sensors further comprising a fourth imaging sensor disposed on the wearable band at a fourth position, the fourth imaging sensor disposed to have a fourth field of view that is lateral to the first axis and is anatomically distal when the wearable band is coupled to an arm of the user.

Example 5 includes the subject matter of any of Examples 1-4, wherein the first field of view comprises a dorsal aspect of a hand of a user, a dorsal aspect of a hand of a user and at least a portion of a range of motion of a proximal phalanx of at least one finger (which may be a thumb) of a hand of a user, or a dorsal aspect of a hand of a user and at least a portion of a range of motion of a first phalanx (e.g., a proximal phalanx) and a second phalanx (e.g., a middle phalanx or a distal phalanx) of at least one finger (which may be a thumb) of a hand of a user, when the wearable band is coupled to an arm of the user.

Example 6 includes the subject matter of any of Examples 1-5, wherein the first field of view of the first imaging sensor comprises a first dorsal aspect of a hand of a user and the second field of the second imaging sensor comprises a second dorsal aspect of a hand of a user and, optionally, wherein the first field of view, the second field of view, or both the first field of view and the second field of view comprise both a dorsal aspect of a hand of a user and at least a portion of a range of motion of a proximal phalanx of at least one finger (which may be a thumb) of a hand of a user or at least a portion of a range of motion of both a first phalanx (e.g., a proximal phalanx) and a second phalanx (e.g., a middle phalanx or a distal phalanx) of at least one finger (which may a thumb) of at least one finger of a hand of a user, when the wearable band is coupled to an arm of the user.

Example 7 includes the subject matter of any of Examples 1-6, wherein the first field of view of the first imaging sensor comprises a first dorsal aspect of a hand of a user and the second field of the second imaging sensor comprises a palmar aspect of a hand of a user when the wearable band is coupled to an arm of the user.

Example 8 includes the subject matter of any of Examples 1-7, further comprising a computing device operable to communicate with the first imaging sensor via a hardwired or a wireless communication pathway and operable to receive image data from the first imaging sensor.

Example 9 includes the subject matter of any of Examples 1-8, and further comprises a computing device operable to communicate with the first imaging sensor and the second imaging sensor via a hardwired or a wireless communication pathway and operable to receive image data from the first imaging sensor and the second imaging sensor and a stitching module comprising a stitching model executable by the computing device to stitch received image data from the first imaging sensor and the second imaging sensor for a correlated time to create a stitched image at the correlated time and, optionally, to stitch received image data from the first imaging sensor and the second imaging sensor for a plurality of correlated times to create a plurality of stitched images corresponding, respectively, to the plurality of correlated times.

Example 10 includes the subject matter of any of Examples 1-9, and further comprises a 3D prediction module comprising a 3D prediction model executable by the computing device and configured to analyze the plurality of stitched images and to approximate or to determine a position of one or more fingertips of a user at the plurality of correlated times.

Example 11 includes the subject matter of any of Examples 1-10, and further comprises a kinematic module comprising a kinematic model executable by the computing device to determine or approximate, based at least in part on the approximated or determined position of one or more fingertips, a position and orientation of hand joint angles including one or more of a metacarpophalangeal joint angle, a proximal interphalangeal joint angle, a distal interphalangeal joint angle, or a radiocarpal joint angle.

Example 12 includes the subject matter of any of Examples 1-11, wherein the distance is less than about 5 mm.

Example 13 includes the subject matter of any of Examples 1-12, and further comprises a processing device operable to process image data from the one or more imaging sensors, the image data comprising spatial information associated with less than 50% of hand joints and/or finger tips of a hand pose and to predict from the image data, spatial information for a remainder of the hand joints and/or finger tips of a hand pose of a user.

Example 14 is a method comprising the act of receiving image data from a wrist borne wearable device bearing a plurality of imaging sensors disposed to image at least a portion of a hand of a user excluding a distal phalanx of one or more fingers of the user, the image data comprising image data from each of the plurality of imaging sensors at a first time, an optical axis of each of the plurality of imaging sensors being spaced from an outer surface of the wearable device by less than about 10 mm. Example 14 also includes the act of determining, from the image data, a position of one or more distal phalanxes or fingertips of the user at the first time and the act of determining, from the image data and the determined position of the one or more distal phalanxes or fingertips of the user, a pose of the hand of the user at the first time.

Example 15 includes the subject matter of Example 14, wherein the determining of the position of the one or more distal phalanxes or fingertips of the user is performed by a convolution neural network.

Example 16 includes the subject matter of Example 14 or Example 15, wherein the determining of the pose of the hand of the user is performed by inference with a skeletal and kinematic model.

Example 17 includes the subject matter of any of Examples 14-16, wherein the pose of the hand of the user includes a metacarpophalangeal joint angle, a proximal interphalangeal joint angle, a distal interphalangeal joint angle, a radiocarpal joint angle, or any combination thereof.

Example 18 includes the subject matter of any of Examples 14-17, and further comprises the acts of receiving image data from the plurality of imaging sensors at a second time and determining a pose of the hand of the user at the second time.

Example 19 is a method for tracking the position of a hand comprising the act of receiving one or more first images from one or more imaging sensors of a wrist borne wearable device, the one or more first images including image data of one or more portions of a user's hand, but excluding image data of one or more distal phalanxes or of one or more fingertips. Example 19 also includes the act of determining, based on the one or more first images, a 3D spatial position of one or more portions of the user's hand that are not represented in the one or more first images. Example 19 also includes the act of determining a pose of the hand based on the determined 3D spatial position.

Example 20 includes the subject matter of Example 19, wherein the determining of the 3D spatial position of the one or more portions of the user's hand that are not represented in the one or more first images is performed using a deep neural network.

Example 21 includes the subject matter of Example 19 or Example 20 and further comprises receiving a plurality of first images from a plurality of imaging sensors of a wrist borne wearable device, the plurality of first images including image data of one or more portions of a user's hand, but excluding image data of one or more distal phalanxes or of one or more fingertips. Example 21 further includes the acts of stitching at least some of the plurality of first images to create a stitched plurality of first images and determining, based on the stitched plurality of first images, a 3D spatial position of one or more portions of the user's hand that are not represented in the plurality of first images. Example 21 optionally includes the act of determining a pose of the hand based on the determined 3D spatial position.

Example 22 includes the subject matter of any of Examples 19-21, wherein the determining of the pose of the hand is performed, at least in part, using a kinematic model that infers the pose of the hand based, at least in part, on the 3D spatial position of the one or more portions of the user's hand that are not represented in the one or more first images.

Example 23 includes the subject matter of any of Examples 19-22, wherein the plurality of first images comprises image data for only a dorsal aspect of the hand of the user.

Example 24 includes the subject matter of any of Examples 19-23, wherein the plurality of first images comprises image data for a dorsal aspect of the hand of the user and at least a portion of a proximal phalanx of at least one finger (which may be a thumb) of the hand of the user.

Example 25 includes the subject matter of any of Examples 19-24, wherein the plurality of first images comprises image data for a dorsal aspect of the hand of the user, at least a portion of first phalanx (e.g., a proximal phalanx) of at least one finger (which may be a thumb) of the hand of the user, and at least a portion of and a second phalanx (e.g., a middle phalanx or a distal phalanx) at least one finger (which may be a thumb) of the hand of the user.

What is claimed is:

1. A system, comprising:
a wearable band comprising one or more pieces extending longitudinally along a first axis and operable to be coupled to an arm of a user; and
a plurality of imaging sensors, the plurality of imaging sensors comprising a first imaging sensor disposed at a first position on the wearable band, the first imaging sensor disposed to have a first field of view that is lateral to the first axis and is anatomically distal when the wearable band is coupled to an arm of the user;
wherein the first imaging sensor defines an optical axis, and wherein the optical axis is spaced a distance from the wearable band, the distance being less than about 10 mm;
wherein a plurality of first images are received from the plurality of imaging sensors, the plurality of first images including image data of one or more portions of a hand of the user, but excluding image data of one or more distal phalanxes or of one or more fingertips;
wherein at least some of the plurality of first images are stitched to create a stitched plurality of first images;
wherein, based on the stitched plurality of first images, a 3D spatial position is determined of one or more portions of the user's hand that are not represented in the plurality of first images;
wherein a pose of the hand is determined based on the determined 3D spatial position; and
wherein the determining of the pose of the hand based on the determined 3D spatial position is performed, at least in part, using a kinematic model that infers the pose of the hand based, at least in part, on the 3D spatial position of the one or more portions of the user's hand that are not represented in the one or more first images.

2. The system as in claim 1, the plurality of imaging sensors further comprising a second imaging sensor disposed on the wearable band at a second position, the second imaging sensor disposed to have a second field of view that is lateral to the first axis and is anatomically distal when the wearable band is coupled to an arm of the user, wherein the second field of view is different from the first field of view.

3. The system as in claim 2, the plurality of imaging sensors further comprising a third imaging sensor disposed on the wearable band at a third position, the third imaging sensor disposed to have a third field of view that is lateral to the first axis and is anatomically distal when the wearable band is coupled to an arm of the user, wherein the third field of view is different from the first field of view and the second field of view.

4. The system as in claim 3, the plurality of imaging sensors further comprising a fourth imaging sensor disposed on the wearable band at a fourth position, the fourth imaging sensor disposed to have a fourth field of view that is lateral to the first axis and is anatomically distal when the wearable band is coupled to an arm of the user.

5. The system as in claim 1, wherein the first field of view comprises a dorsal aspect of a hand of a user, a dorsal aspect of a hand of a user and at least a portion of a range of motion of a phalanx of at least one finger of a hand of a user, or a dorsal aspect of a hand of a user and at least a portion of a range of motion of a first phalanx and a second phalanx of at least one finger of a hand of a user, when the wearable band is coupled to an arm of the user.

6. The system as in claim 2, wherein the first field of view of the first imaging sensor comprises a first dorsal aspect of a hand of a user and the second field of the second imaging sensor comprises a second dorsal aspect of a hand of a user and, optionally, wherein the first field of view, the second field of view, or both the first field of view and the second field of view comprise both a dorsal aspect of a hand of a user and at least a portion of a range of motion of a proximal phalanx of at least one finger of a hand of a user or at least a portion of a range of motion of both a first phalanx and a second phalanx of at least one finger of a hand of a user, when the wearable band is coupled to an arm of the user.

7. The system as in claim 2, wherein the first field of view of the first imaging sensor comprises a first dorsal aspect of a hand of a user and the second field of the second imaging sensor comprises a palmar aspect of a hand of a user when the wearable band is coupled to an arm of the user.

8. The system as in claim 1, further comprising a computing device operable to communicate with the first imaging sensor via a hardwired or a wireless communication pathway and operable to receive image data from the first imaging sensor.

9. The system as in claim 2, further comprising:
a computing device operable to communicate with the first imaging sensor and the second imaging sensor via a hardwired or a wireless communication pathway and operable to receive image data from the first imaging sensor and the second imaging sensor; and
a stitching module comprising a stitching model executable by the computing device to stitch received image data from the first imaging sensor and the second imaging sensor for a correlated time to create a stitched image at the correlated time and, optionally, to stitch received image data from the first imaging sensor and the second imaging sensor for a plurality of correlated times to create a plurality of stitched images corresponding, respectively, to the plurality of correlated times.

10. The system as in claim 9, further comprising a 3D prediction module comprising a 3D prediction model executable by the computing device and configured to analyze the plurality of stitched images and to approximate or to determine a position of one or more fingertips of a user at the plurality of correlated times.

11. The system as in claim 10, further comprising a kinematic module comprising a kinematic model executable by the computing device to determine or approximate, based at least in part on the approximated or determined position of one or more fingertips, a position and orientation of hand joint angles including one or more of a metacarpophalangeal joint angle, a proximal interphalangeal joint angle, a distal interphalangeal joint angle, or a radiocarpal joint angle.

12. The system as in claim 1, wherein the distance is less than about 5 mm.

13. The system as in claim 1, further comprising a processing device operable to process image data from the plurality of imaging sensors, the image data comprising spatial information associated with less than 50% of hand joints and/or fingertips of a hand pose and to predict from the image data, spatial information for a remainder of the hand joints and/or fingertips of a hand pose of a user.

14. A method, comprising:
receiving image data from a wrist borne wearable device bearing a plurality of imaging sensors disposed to image at least a portion of a hand of a user excluding a distal phalanx of one or more fingers of the user, the image data comprising image data from each of the plurality of imaging sensors at a first time, an optical axis of each of the plurality of imaging sensors being spaced from an outer surface of the wrist borne wearable device by less than about 10 mm;

determining, from the image data, a position of one or more distal phalanxes or fingertips of the user at the first time; and determining, from the image data and the determined position of the one or more distal phalanxes or fingertips of the user, a pose of the hand of the user at the first time;

the method further comprising:

receiving a plurality of first images from the plurality of imaging sensors of the wrist borne wearable device, the plurality of first images including image data of one or more portions of the user's hand, but excluding image data of one or more distal phalanxes or of one or more fingertips;

stitching at least some of the plurality of first images to create a stitched plurality of first images;

determining, based on the stitched plurality of first images, a 3D spatial position of one or more portions of the user's hand that are not represented in the plurality of first images; and determining a pose of the hand based on the determined 3D spatial position;

wherein the determining of the pose of the hand based on the determined 3D spatial position is performed, at least in part, using a kinematic model that infers the pose of the hand based, at least in part, on the 3D spatial position of the one or more portions of the user's hand that are not represented in the one or more first images.

15. The method of claim 14, wherein the determining of the position of the one or more distal phalanxes or fingertips of the user is performed by a convolution neural network.

16. The method of claim 14, wherein the determining of the pose of the hand of the user is performed by inference with a skeletal and kinematic model.

17. The method of claim 14, wherein the pose of the hand of the user includes a metacarpophalangeal joint angle, a proximal interphalangeal joint angle, a distal interphalangeal joint angle, a radiocarpal joint angle, or any combination thereof.

18. The method of claim 14, further comprising:

receiving image data from the plurality of imaging sensors at a second time; and determining a pose of the hand of the user at the second time.

19. A method for tracking a position of a hand, comprising:

receiving a plurality of first images from a plurality of imaging sensors of a wrist borne wearable device, the plurality of first images including image data of one or more portions of a user's hand, but excluding image data of one or more distal phalanxes or of one or more fingertips;

stitching at least some of the plurality of first images to create a stitched plurality of first images;

determining, based on the stitched plurality of first images, a 3D spatial position of one or more portions of the user's hand that are not represented in the plurality of first images; and determining a pose of the hand based on the determined 3D spatial position;

wherein the determining of the pose of the hand is performed, at least in part, using a kinematic model that infers the pose of the hand based, at least in part, on the 3D spatial position of the one or more portions of the user's hand that are not represented in the plurality of first images.

20. The method of claim 19, wherein the determining of the 3D spatial position of the one or more portions of the user's hand that are not represented in the one or more first images is performed using a deep neural network.

21. The method of claim 19, wherein the plurality of first images comprises image data for only a dorsal aspect of the hand of the user.

22. The method of claim 19, wherein the plurality of first images comprises image data for a dorsal aspect of the hand of the user and at least a portion of a proximal phalanx of at least one finger of the hand of the user.

23. The method of claim 19, wherein the plurality of first images comprises image data for a dorsal aspect of the hand of the user, at least a portion of a first phalanx of at least one finger of the hand of the user, and at least a portion of a second phalanx of at least one finger of the hand of the user.

* * * * *